United States Patent
Kaihara et al.

(10) Patent No.: US 8,022,847 B2
(45) Date of Patent: Sep. 20, 2011

(54) SIGNAL PROCESSING DEVICE

(75) Inventors: Rie Kaihara, Kyoto (JP); Youichi Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/666,722

(22) PCT Filed: Jun. 16, 2008

(86) PCT No.: PCT/JP2008/001540
§ 371 (c)(1),
(2), (4) Date: Dec. 24, 2009

(87) PCT Pub. No.: WO2009/001521
PCT Pub. Date: Dec. 31, 2008

(65) Prior Publication Data
US 2010/0188275 A1     Jul. 29, 2010

(30) Foreign Application Priority Data
Jun. 27, 2007   (JP) ................................ 2007-168445

(51) Int. Cl.
*H03M 1/06*  (2006.01)
(52) U.S. Cl. ........ 341/118; 341/119; 341/155; 341/117; 341/156; 369/124.11; 369/44.29
(58) Field of Classification Search ............... 369/124.1, 369/44.28, 44.36, 44.29, 124.11; 700/94; 341/118, 155, 120, 119, 117, 156
See application file for complete search history.

(56) References Cited

U.S. PATENT DOCUMENTS

| | | | |
|---|---|---|---|
| 5,982,310 A | 11/1999 | Tanaka | |
| 6,195,320 B1 | 2/2001 | Furumiya et al. | |
| 6,690,628 B2 * | 2/2004 | Yoshimi et al. | 369/44.28 |
| 2003/0117912 A1 * | 6/2003 | Yoshimi et al. | 369/44.28 |
| 2003/0174601 A1 * | 9/2003 | Tsai et al. | 369/44.36 |
| 2004/0172148 A1 * | 9/2004 | Horibe | 700/94 |
| 2005/0180298 A1 * | 8/2005 | Horibe et al. | 369/124.1 |

FOREIGN PATENT DOCUMENTS

| | | |
|---|---|---|
| JP | 10-11899 | 1/1998 |
| JP | 2000-82259 | 3/2000 |
| JP | 2000-182239 | 6/2000 |
| WO | 03/077248 | 9/2003 |

OTHER PUBLICATIONS

International Search Report issued Sep. 9, 2008 in International (PCT) Application No. PCT/JP2008/001540.
Written Opinion of the International Searching Authority issued Sep. 9, 2008 in International (PCT) Application No. PCT/JP2008/001540.

* cited by examiner

*Primary Examiner* — Jean Jeanglaude
(74) *Attorney, Agent, or Firm* — Wenderoth Lind & Ponack, L.L.P.

(57)   ABSTRACT

A signal processing device, even when a steep difference in DC level is included in a signal read from a disc such as a DVD-RAM format, cuts off the DC level and pulls the read signal into an appropriate A/D input level. A steep difference in DC level between a data section and a CAPA section is absorbed by a first offset unit, and an asymmetry which occurs due to variations in the disc manufacturing stage is corrected by a second offset unit. Further, a control signal for operating the two offset units exclusively is generated by a controller, thereby controlling both offset units.

8 Claims, 19 Drawing Sheets

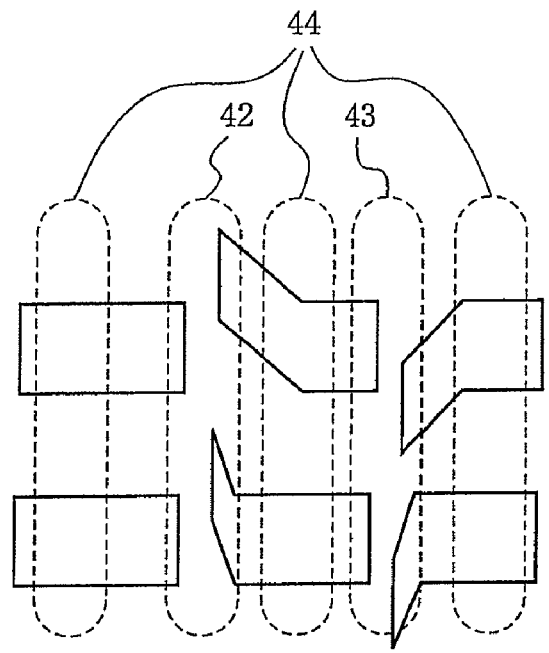
Fig. 17 (a)
Fig. 17 (b)
Fig. 17 (c)
Fig. 18
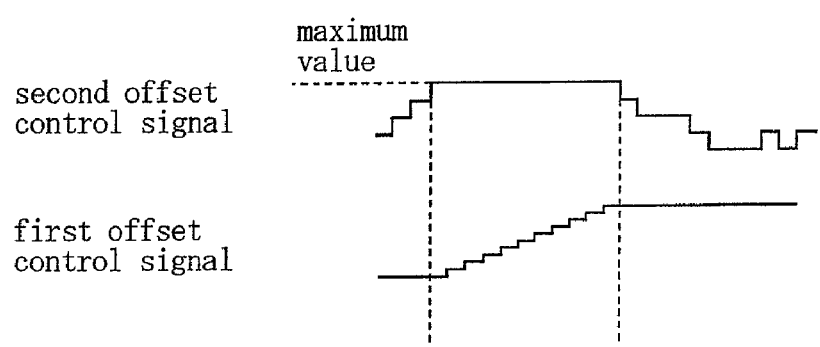

Fig. 20
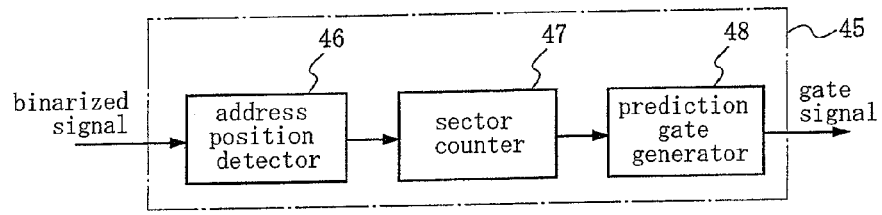
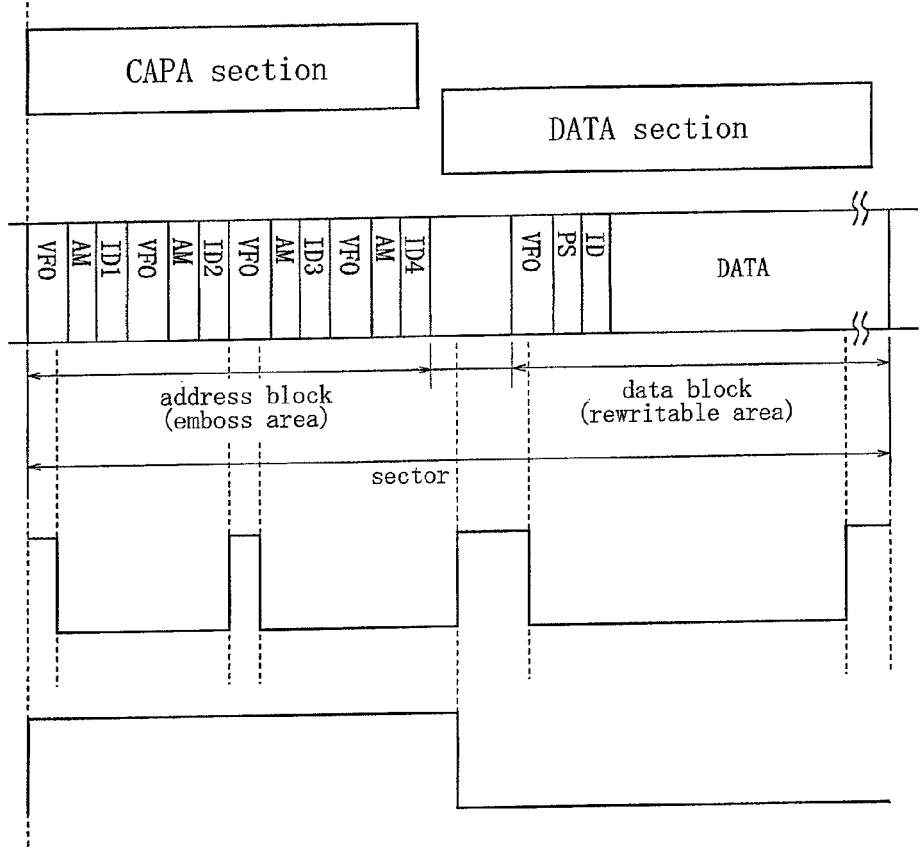
Fig. 21
(a)
Fig. 21
(b)
Fig. 21
(c)
Fig. 22
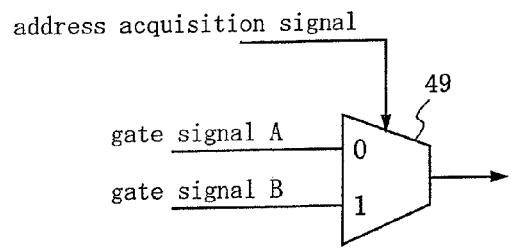

SIGNAL PROCESSING DEVICE

BACKGROUND OF THE INVENTION

1. Technical Field

The present invention relates to a signal processing device which analog-to-digital converts data recorded on an information recording medium to reproduce the data. More particularly, the invention relates to an improvement of a technique for adjusting a DC voltage of an analog signal in order to efficiently use an input dynamic range of an A/D converter.

2. Background Art

While an analog signal processing IC and a digital signal processing LSI have conventionally been configured in different chips, approaches for reducing circuit scale, footprint, and external parts by integrating these ICs in one chip have been made. Further, a cost-down effect due to semiconductor process shrinkage can be easily obtained by promoting digitization of analog signal processing circuits.

With these approaches, the conventional signal processing circuit is required to perform efficient analog-to-digital conversion in a unit for converting an analog signal into a digital signal (hereinafter referred to as A/D conversion), that is, to covert an analog signal into a digital signal with the maximum amplitude, within an input dynamic range of an A/D converter.

As an example of such conventional art, one disclosed in Patent Document 1 has been known.

FIG. 2 shows the conventional signal processing device disclosed in Patent Document 1, which is arbitrarily modified to facilitate the explanation.

The conventional signal processing device comprises, for example, a high-pass filter 8 which cuts off a low-frequency component included in an input signal that is reproduced from an information recording medium to remove a DC offset from the reproduced signal, a variable gain amplifier 9 which gives a gain according to an input gain control signal to the reproduced signal from which the DC offset has been removed by the high-pass filter 8, an equalizer 10 which receives an output of the variable gain amplifier 9 and performs waveform equalization, an offset unit 11 which receives an output of the equalizer 10 and gives a DC offset according to an input offset control signal to the input signal, an A/D converter 3 which receives an output of the offset unit 11 and performs analog-to-digital conversion, a peak detector 4 which performs peak detection from sampling data obtained by the A/D converter 3, a bottom detector 5 which performs bottom detection from the sampling data obtained by the A/D converter 3, an amplitude detector 12 which calculates amplitude information in the input signal to the A/D converter 3 from the detected peak value and the detected bottom value, an offset detector 6 which calculates offset information in the input signal to the A/D converter 3 from the detected peak value and the detected bottom value, a gain controller 14 which controls the variable gain amplifier 9 to make the input amplitude of the A/D converter 3 constant, based on the amplitude information obtained by the amplitude detector 12, and an offset controller 13 which controls the offset unit 11 to make the input offset of the A/D converter 3 constant, based on the offset information obtained by the offset detector 6.

Next, the operation will be described. For example, a signal recorded in an information recording medium such as an optical disc is reproduced by a reproduction means such as an optical pickup. A low-frequency component is removed from the reproduced by the high-pass filter 8, and the resultant signal is output to the variable gain amplifier 9.

The variable gain amplifier 9 is controlled to make the input amplitude of the A/D converter 3 constant, and gives the controlled gain to the input signal from the high-pass filter 8. The equalizer 10 performs equalization to the output signal from the variable gain amplifier 9.

The offset unit 11 is controlled to make the input offset of the A/D converter 3 constant, and gives the controlled offset to the input signal from the equalizer 10.

The A/D converter 3 converts the output signal of the offset unit 11 from an analog signal to a digital signal. The peak detector 4 detects a peak of the output signal from the A/D converter 3, and the bottom detector 5 detects a bottom of the output signal from the A/D converter 3.

The amplitude detector 12 calculates amplitude information of the input signal to the A/D converter 3 from the signals detected by the peak detector 4 and the bottom detector 5, thereby to detect the amplitude information. The gain controller 14 controls the gain to be given by the variable gain amplifier 9 so as to make the input amplitude of the A/D converter 3 constant, based on the amplitude information detected by the amplitude detector 12.

The offset detector 6 calculates offset information of the input signal to the A/D converter 3 from the signals detected by the peak detector 4 and the bottom detector 5, thereby to detect the offset information. The offset controller 13 controls the offset to be given by the offset controller 13 so as to make the input offset of the A/D converter 3 constant, based on the offset information detected by the offset detector 6.

The function of the equalizer 10 will be described in more detail. When reproducing a high-density recorded optical medium or the like, the signal amplitudes of relatively short recording marks are reduced due to optical frequency characteristics. Therefore, the equalizer 10 boosts up this frequency band to improve the SNR (Signal to Noise Ratio) of the signal.

Next, the function of the offset unit 11 will be described in more detail. Although the input signal to the high-pass filter 8 becomes DC free after passing through the high-pass filter 8, if the recording marks are formed larger or smaller than their proper lengths due to variations in the manufacturing stage of the information recording medium, the ratio between the "H" section and "L" section of the signal deviates from 50:50, and this deviation causes a phenomenon that the average DC level of the reproduced signal deviates from the center position between the upper and lower peaks of the reproduced signal. This phenomenon frequently occurs when the recording condition is not appropriate, and it is generally called "asymmetry".

When the reproduced signal having such asymmetry passes through the high-pass filter 8, its DC component is cut off, and a DC offset occurs in the input signal to the A/D converter 3 as shown in FIG. 3. As the DC offset increases, the reproduced signal waveform might exceed the input dynamic range of the A/D converter 3, which causes a problem that a portion of the waveform is lost and thereby correct A/D conversion cannot be performed. In the conventional configuration shown in FIG. 2, the offset unit 11 is placed behind the high-pass filter 8 to provide a control loop for controlling the offset unit 11 by the offset controller 13. Thereby, even when a reproduced signal having an asymmetry is inputted, this reproduced signal can be efficiently included in the input dynamic range of the A/D converter 3.

Next, a format of a DVD-RAM which is a kind of an optical disc will be described.

As a physical format of the DVD-RAM, a wobble land/groove system is adopted. The wobble land/groove system is, as shown in FIG. 4, a system of recording marks in a convex groove track 15 and a concave land track 16 which are recorded on the surface of the optical disc, viewed from the side to which laser light is applied.

The groove track 15 and the land track 16 are separated into units called sectors, and a header region 17 is formed at the beginning of each sector. In this header region 17, sector address information has been recorded in the form of a pit sequence at the time of manufacture. Therefore, in the wobble land/groove system, detection of the sector address can be performed by reading the pit sequence in the header region 17.

In the header region 17, the pit sequence is divided into two parts in the track direction, and the respective pit sequences are arranged in the form called CAPA (Complementary Allocated Pit Address), i.e., arranged so as to be offset at an interval that is half the track width (pitch), alternately in the radial direction of the optical disc, with respect to the respective tracks.

By the way, as a conventional art for reproducing a information recording medium having a format such as the DVD-RAM format, one disclosed in Patent Document 2 has been known.

FIG. 5 shows a front-end part of a conventional optical disc reproducing apparatus disclosed in Patent Document 2. To be specific, reading of recorded data from an optical disc 18 is performed by an optical disc 20 with the optical disc 18 being rotated by a spindle motor 19. Initially, in the optical head 20, laser light emitted from a laser diode 20a travels straight through a beam splitter 20b to be applied onto the recording surface of the optical disc 18 via an objective lens 20c. When the laser light reflected from the optical disc 18 travels backward to reach the beam splitter 20b via the objective lens 20c, it is reflected by the beam splitter 20b at about a right angle to the advancing direction to be received by a photodetector 20d.

The light-receiving area of the photodetector 20d is divided into two parts along each of the radial direction and the tangential direction with respect to the track sequence on the optical disc 18, i.e., it is divided into four light-receiving areas. Electrical signals obtained from the four light-receiving areas of the photodetector 20d are converted from current signals into voltage signals by I/V conversion amplifiers 21a, 21b, 21c, and 21d, respectively, and then level-added by an adder 22 to produce a sum signal.

In this sum signal, as shown in FIG. 6(*b*), the DC level obtained in the header field 17 is higher than the DC level obtained in the data field.

The reason why the DC level of the sum signal in the data field is low is because there is a difference in height between the groove track 15 and the land track 16, and when the reflected lights from the both tracks are mixed, the lights having different phases to the wavelength interfere with each other to weaken each other.

Therefore, in the optical disc device, the sum signal outputted from the adder 22 is passed through the high-pass filter 8 to cut off the DC component in the sum signal, thereby to absorb the difference in the DC level between the header region 17 and the data region 23. The sum signal from which the DC level difference has been removed by the high-pass filter 8 is input to the variable gain amplifier 9 shown in FIG. 2.

By the way, the time constant of the operation of the high-pass filter 8 must be set short in order to rapidly absorb the DC level of the sum signal, at the timing when the DC level of the sum signal is changed, i.e., at the timing when the sum signal in the data region is changed to that in the header region or when the sum signal in the header region is changed to that in the data region.

On the other hand, when the time constant of the operation of the high-pass filter 8 is set short, there may occur a drawback that the low-frequency component of the input data has a distortion.

Therefore, in the optical disc device, the sum signal is supplied to a pull-in pulse generation circuit 24 shown in FIG. 5, and as shown in FIG. 6(*b*), a pull-in pulse which becomes H level for a predetermined period is generated at the timing when the DC level of the sum signal is changed to be supplied to the high-pass filter 8. The high-pass filter 8 is switched between the state where the time constant of its operation is short and the state where it is long, for the H level section and the L level section of the pull-in pulse, respectively.

Thereby, as shown in FIG. 6(*c*), the high-pass filter 8 can rapidly pull the sum signal after the DC level change into the state where the DC level is cut off, and can prevent the pulled-in sum signal from having a distortion.

A configuration example of the high-pass filter 8 is shown in FIG. 7.

The high-pass filter 8 has capacitors 28 and 29 between an LSI terminal 25 and LSI terminals 26 and 27, respectively, and thus the high-pass filter 80 is configured by the capacitor 28 or the capacitor 29 and a resistor 30 inside the LSI. Selection of the capacitor 28 or 29 to be connected is performed by providing analog switches 31 and 32 in the LSI, and switching the capacitors 28 and 29 according to a control signal from the pull-in pulse generator 24 so that one of the capacitors is turned on while the other is turned off.

The required cutoff frequency of the high-pass filter 8 is several tens Hz in the data region, and it must be set at several hundreds kHz in order to absorb a DC difference in the header region, and therefore, it is necessary to switch the cutoff frequency in the order of about 10000 times.

As another method of switching the cutoff frequency, switching of the resistance value can be considered. However, when using the resistor in the LSI, it is difficult to accurately produce a pair of resistors having a resistance value of about 10000 times. Further, since it is also difficult to produce a pair of capacitors having a capacitance value of 10000 times, it is necessary to adopt a configuration which enables switching of the capacitance value using a capacitor externally attached to the LSI as shown in FIG. 7, or a configuration which enables switching of the resistance value using an external resistor.

Patent Document 1: International Publication No. 03/077248
Patent Document 2: Japanese Published Patent Application No. 2000-182239

FIG. 8 is a graph illustrating the relation between the semiconductor process rule and the ratio of the pad area to the chip area. A pad is an electrode onto which a wire 33 is bonded when a terminal of an LSI is connected to a lead frame by the wire. As shown in FIG. 9, an end of a lead frame 34 is a portion to be a terminal of the LSI, and an electrode existing on the periphery of a semiconductor chip 35 is a pad 36. The LSI is completed by sealing the external surface of the LSI with a resin, and then cutting the terminal portions.

As shown in FIG. 8, when semiconductor chips of the same circuit scale are assumed, the areas of pads in the chips must be equal to each other regardless of the process rule. Accordingly, when the chips are equipped with circuits of the same function, the ratio of the pad area to the chip area is increased as the process rule is decreased, resulting in a disadvantage costwise.

FIG. 10 is a rough schematic diagram of the chip. In FIG. 10, reference numeral 37 denotes an actual circuit part, and reference numeral 36 denotes pads.

In FIG. 10, the semiconductor chip size depends on the number of pads, and the effect of process shrinkage cannot be exerted. That is, when shrinkage of the semiconductor process rule is further advanced hereafter, a reduction in the number of terminals will be an important challenge.

By the way, as shown in FIG. 7, the conventional high-pass filter 8 for absorbing a difference in DC voltage in the input signal requires three terminals.

Further, when the reproduced signal is transferred by a differential transfer method to improve the S/N characteristics, six terminals are required in the conventional art, and the number of terminals will be further increased.

The present invention is made to solve the above-described problems and has for its object to provide a signal processing device which can absorb a difference in DC component between reproduced signals in different reproduction sections by effectively performing an offset control, without using the method of switching the time constant of a high-pass filter to absorb a steep DC difference.

SUMMARY OF THE INVENTION

In order to achieve the above-described object, according to the present invention, there is provided a signal processing device comprising: a first offset unit which gives a DC offset according to an offset control signal to a reproduced signal input; a second offset unit which gives a DC offset according to an offset control signal to the reproduced signal input; an A/D converter which receives either of the outputs from the first and second offset units as an input signal, and analog-to-digital converting the input signal by sampling the same with a clock having a predetermined clock period T to output sampling data; a peak detector which receives the output from the A/D converter, and performs peak detection with a clock having a period that is m times (m: positive integer) of the clock period T; a bottom detector which receives the output from the A/D converter, and performs bottom detection with a clock having a period that is n times (n: positive integer) of the clock period T; an offset detector which receives the output from the peak detector and the output from the bottom detector, and calculates a signal offset in the input signal to the A/D converter to output an offset information signal; and a controller which exclusively controls the offset controls performed by the first and second offset units according to the offset information signal outputted from the offset detector; wherein the offset in the input signal to the A/D converter is kept approximately constant independently of a local variation in the reproduced signal.

According to the above-described configuration, when a reproduced signal including a steep difference in DC voltage is inputted, the DC difference is absorbed without increasing the number of terminals, and thereby an offset in the input signal to the A/D converter can be kept approximately constant.

Further, the signal processing device of the present invention includes a gate generator for generating a gate signal, the controller exclusively controls the offset controls performed by the first and second offset units, according to the offset information signal and the gate signal, and the offset in the input signal to the A/D converter is kept approximately constant independently of a local variation in the reproduced signal.

According to the above-described configuration, when a reproduced signal including a steep difference in DC voltage is inputted, the DC difference is absorbed without increasing the number of terminals, and efficient control suitable for the format of the information recording medium is carried out, and thus an offset in the input signal to the A/D converter can be kept approximately constant.

Further, the signal processing device of the present invention includes a storage unit which holds information of a control signal outputted from the controller, and the held information to be input to the controller is controlled by the gate signal outputted from the gate generator.

According to the above-described configuration, when a reproduced signal including a steep difference in DC voltage is inputted, the DC difference is absorbed without increasing the number of terminals, and the control amount of the offset unit is held in the storage unit, and thus the time required until the DC difference is pulled in the center can be reduced.

Further, according to the present invention, there is provided a signal processing device comprising: a first offset unit which gives a DC offset according to an offset control signal to a reproduced signal input; a second offset unit which gives a DC offset according to an offset control signal to the reproduced signal input; an A/D converter which receives either of the outputs from the first and second offset units as an input signal, and analog-to-digital converting the input signal by sampling the same with a clock having a predetermined clock period T to output sampling data; a peak detector which receives the output from the A/D converter, and performs peak detection with a clock having a period that is m times (m: positive integer) of the clock period T; a bottom detector which receives the output from the A/D converter, and performs bottom detection with a clock having a period that is n times (n: positive integer) of the clock period T; an offset detector which receives the output from the peak detector and the output from the bottom detector, and calculates a signal offset in the input signal to the A/D converter to output an offset information signal; and a controller which exclusively controls the offset controls of the first and second offset units according to the offset information signal outputted from the offset detector, and is able to hold the control operation or change the control speed upon reception of a hold signal; wherein the signal offset in the input signal to the A/D converter is kept approximately constant independently of a local variation in the reproduced signal.

According to the above-described configuration, a signal offset in the input signal to the A/D converter can be kept approximately constant independently of a local variation in the reproduced signal.

Further, according to the present invention, there is provided a signal processing device comprising: a variable gain amplifier which gives a gain according to a set value to a reproduced signal input; a first offset unit which receives the output from the variable gain amplifier as an input signal, and gives a DC offset according to an offset control signal to the input signal; a variable gain amplifier which receives the output from the first offset unit as an input signal, and gives a gain according to a gain control signal to the input signal; a second offset unit which receives the output of the variable gain amplifier as an input signal, and gives a DC offset according to an offset control signal to the input signal; an equalizer which receives the output from the second offset unit, and emphasizes a high-frequency band thereof; an A/D converter which receives the output from the equalizer as an input signal, and analog-to-digital converting the input signal by sampling the same with a clock having a predetermined clock period T to output sampling data; a peak detector which receives the output from the A/D converter, and performs peak detection with a clock having a period that is m times (m: positive integer) of the clock period T; a bottom detector which receives the output from the A/D converter, and performs bottom detection with a clock having a period that is n times (n: positive integer) of the clock period T; an offset detector which receives the output from the peak detector and the output from the bottom detector, and calculates a signal offset in the input signal to the A/D converter to output an offset information signal; an amplitude detector which receives the output from the peak detector and the output from the bottom detector, and calculates a signal amplitude in the input signal to the A/D converter to output an amplitude information signal; a gain controller which controls the variable gain amplifiers according to the magnitude relation between the amplitude information signal and a target amplitude value; and an offset controller which controls the first and second offset units according to the magnitude relation between the offset information signal outputted from the offset detector and a target offset value; wherein the signal amplitude and the offset in the input signal to the A/D converter are kept approximately constant independently of a local variation in the reproduced signal.

According to the above-described configuration, a signal amplitude and an offset in the input signal to the A/D converter can be kept approximately constant.

Further, the signal processing device of the present invention includes, between the equalizer and the A/D converter, a third offset unit which receives the output from the equalizer as an input signal, and gives a DC offset according to a set value to the input signal, and a fixed gain amplifier which receives the output from the third offset unit as an input signal, and gives a fixed gain to the input signal to output the signal to the A/D converter.

According to the above-described configuration, the S/N characteristics and the distortion characteristics can be enhanced, and a signal amplitude and an offset in the input signal to the A/D converter can be kept approximately constant.

According to the present invention, it is possible to provide a signal processing apparatus which can absorb a steep difference in DC component that is included in a reproduced signal, without increasing the number of terminals, by performing efficient offset control.

BRIEF DESCRIPTION OF THE DRAWINGS

FIG. 17 is a diagram showing signal variations in the case where a low-pass filter is present at the output of the DA converter and the case where it is absent.

FIG. 18 is a diagram showing a risk management function for offset control.

FIG. 20 is a diagram illustrating a specific example of a gate generator.

FIG. 21 is a diagram illustrating a data structure of a DVD-RAM format and a gate signal to be used for control.

FIG. 22 is a block diagram illustrating a part included in the gate generator.

DESCRIPTION OF REFERENCE NUMERALS

Figure 1:
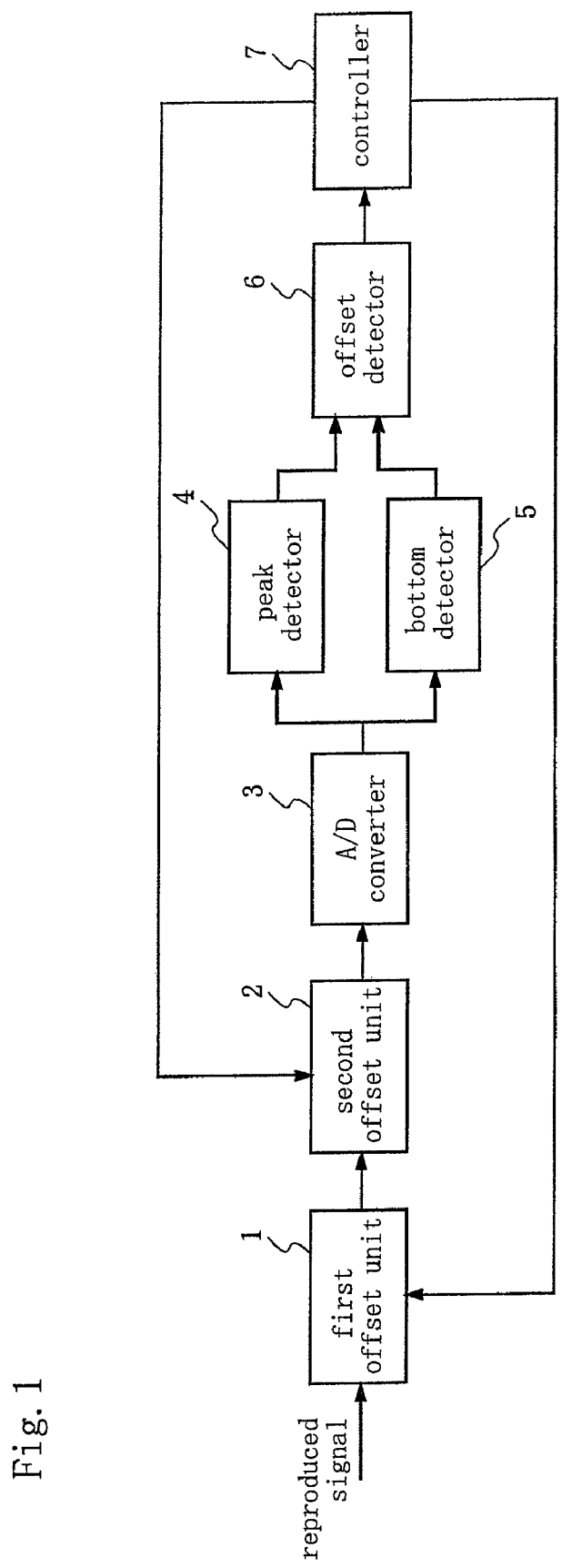
FIG. 1 is a block diagram of a signal processing device according to a first embodiment of the present invention.
Figure 2:
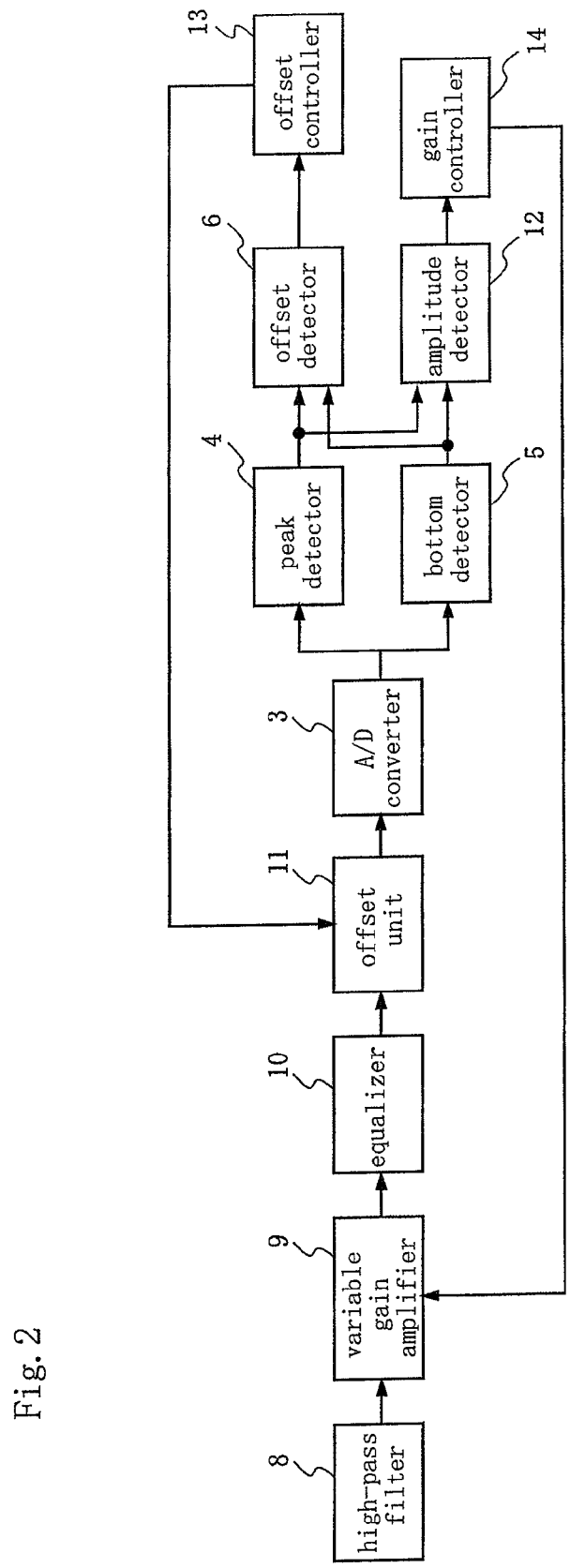
FIG. 2 is a block diagram of a signal processing device which is described as a conventional art in Patent Document 1.
Figure 3:
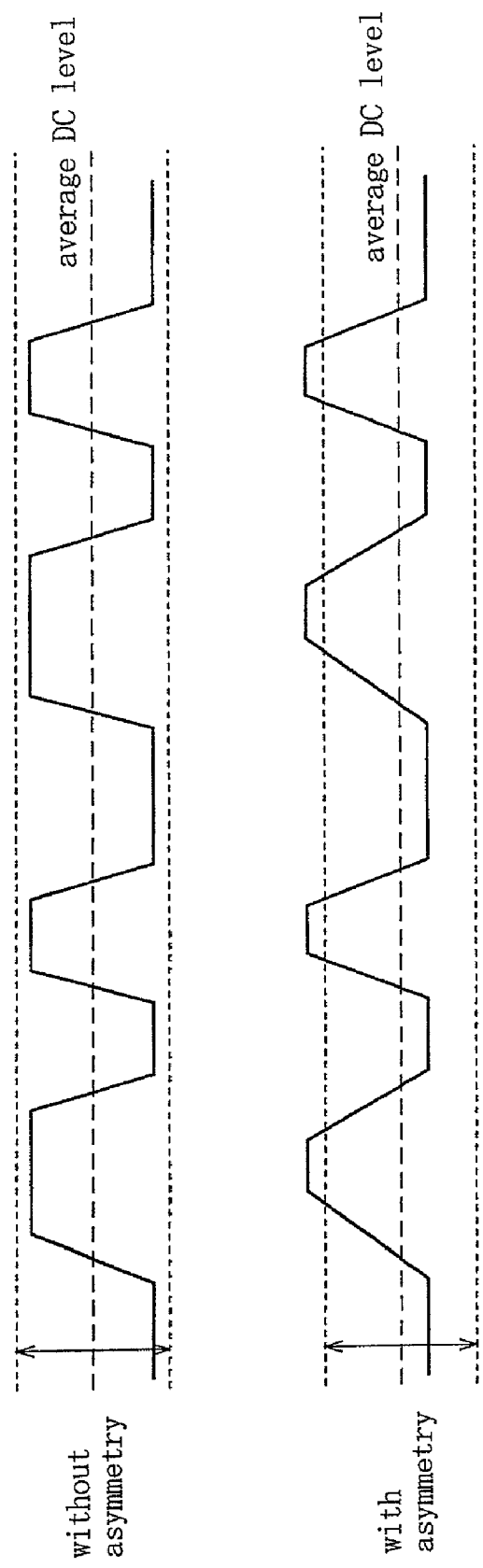
FIG. 3 is a diagram illustrating a reproduced waveform in the case where a reproduced signal has a DC offset.
Figure 4:
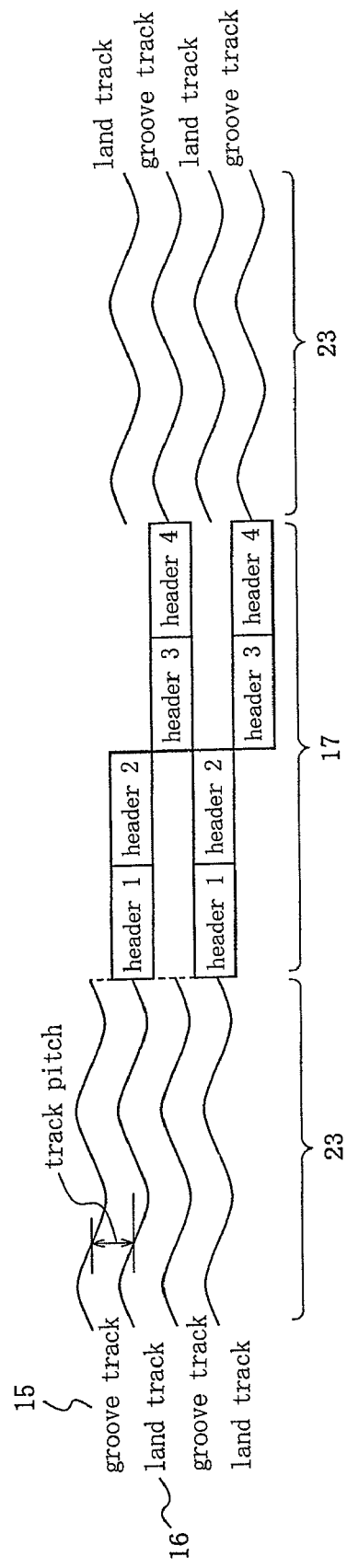
FIG. 4 is a diagram illustrating a recording structure in a DVD-RAM format.
Figure 5:
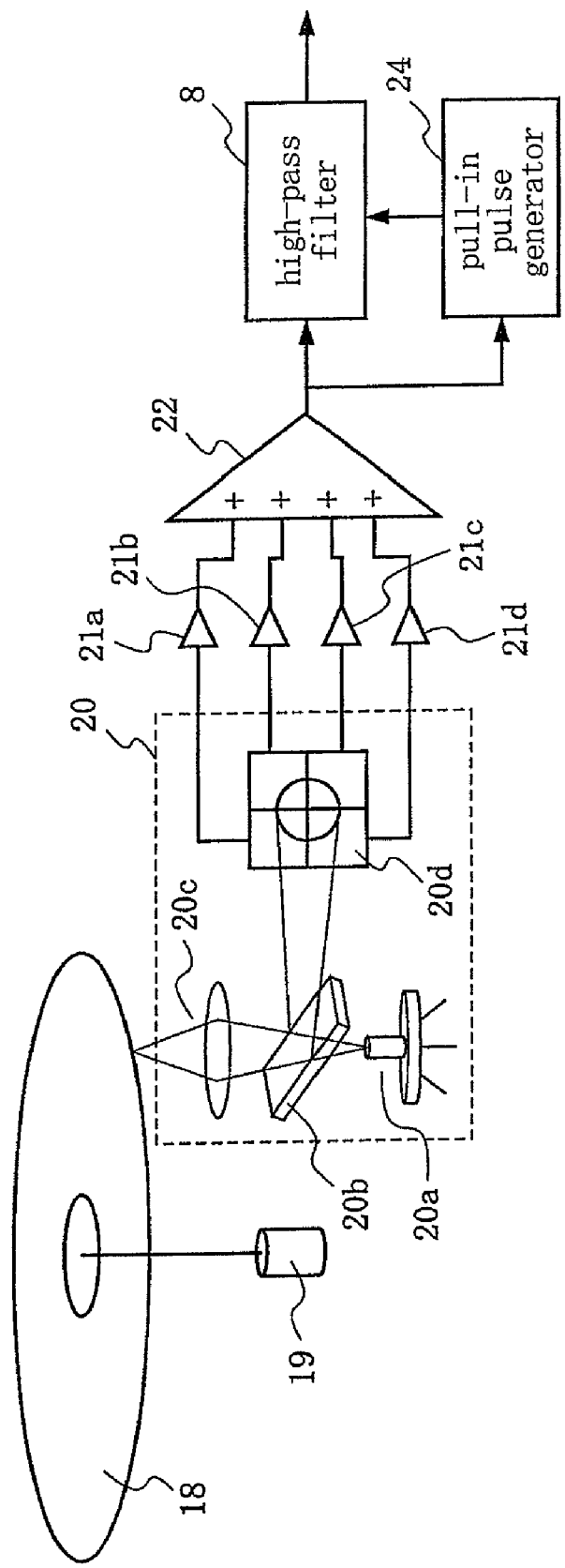
FIG. 5 is a diagram illustrating the conventional optical disc device.

1 . . . first offset unit
2 . . . second offset unit
3 . . . A/D converter
4 . . . peak detector
5 . . . bottom detector
6 . . . offset detector
7 . . . controller
8 . . . high-pass filter
9 . . . variable gain amplifier
10 . . . equalizer
11 . . . offset unit
12 . . . amplitude detector
13 . . . offset controller
14 . . . gain controller
15 . . . groove track
16 . . . land track
17 . . . header section
18 . . . optical disc
19 . . . spindle motor
20 . . . optical head
21a to 21d . . . I/V conversion amplifier
22 . . . adder
23 . . . data section
24 . . . pull-in pulse generator
25 . . . LSI terminal
26 . . . LSI terminal
27 . . . LSI terminal
28 . . . external capacitor
29 . . . external capacitor
30 . . . LSI internal resistor
31 . . . analog switch
32 . . . analog switch
33 . . . wire 34 ... lead frame
35 ... semiconductor chip
36 ... pad
37 ... circuit region in semiconductor chip
38 ... selector
39 ... register
40 ... subtracter
41 ... comparator
42 ... pull-in characteristics when entering CAPA section from data section
43 ... pull-in characteristics when entering data section from CAPA section
44 ... data section
45 ... gate generator
46 ... address position detector
47 ... sector counter
48 ... prediction gate generator
49 ... selector
50 ... storage unit
51 ... selector
52 ... register
53 ... selector
54 ... register
55 ... hold signal generator
56 ... variable gain amplifier
57 ... third offset unit
58 ... fixed gain amplifier

DETAILED DESCRIPTION OF THE INVENTION

Embodiment 1

A first embodiment of the present invention corresponds to inventions disclosed in Claims 1 and 2, wherein first and second offset units are exclusively controlled based on offset information that is detected from sampling data outputted from an A/D converter 3, thereby enabling absorption of a DC offset component without increasing the number of terminals, and inputting of a signal so as to be within the input dynamic range of the A/D converter.

Hereinafter, the first embodiment of the present invention will be described in detail with reference to the drawings.

FIG. 1 is a block diagram of a signal processing device according to the first embodiment.

This signal processing device comprises a first offset unit 1 which gives a DC offset according to an offset control signal to an reproduced signal input, a second offset unit 2 which receives the output of the first offset unit 1 as an input signal and gives a DC offset according to an offset control signal to the input signal, an A/D converter 3 which receives an output of the second offset unit 2 as an input signal, and analog-to-digital converts the input signal by sampling the same with a clock of a predetermined clock period T to output sampling data, a peak detector 4 which receives an output of the A/D converter 3 and performs peak detection with a clock of a period that is m times (m: positive integer) of the above-mentioned clock period, a bottom detector 5 which receives an output of the A/D converter 3 and performs bottom detection with a clock of a period that is n times (n: positive integer) of the above-mentioned clock period, an offset detector 6 which receives an output of the peak detector 4 and an output of the bottom detector 5, and calculates a signal offset in the input signal to the A/D converter 3 to output an offset information signal, and a controller 7 which exclusively controls the offset controls of the first offset unit 1 and the second offset unit 2 according to the offset information signal outputted from the offset detector 6.

Next, the operation of the first embodiment will be described. A reproduced signal from an information recording medium is given offsets in the first offset unit 1 and the second offset unit 2 according to the respective control inputs, and then sampled by the A/D converter 3 with a timing of a clock having a predetermined clock period T to be converted into a quantized digital signal. For simplification, a description will be initially given of the operation in the state where the reproduced signal is input to the A/D converter 3 without being given offsets in the first offset unit 1 and the second offset unit 2.

It is assumed that the input signal to the signal processing device is a reproduced signal of a DVD-RAM format which is a kind of an optical disc. When reproducing the optical disc of the DVD-RAM format, a signal as shown in FIG. 6(a) is input to the A/D converter 3.

Figure 6:
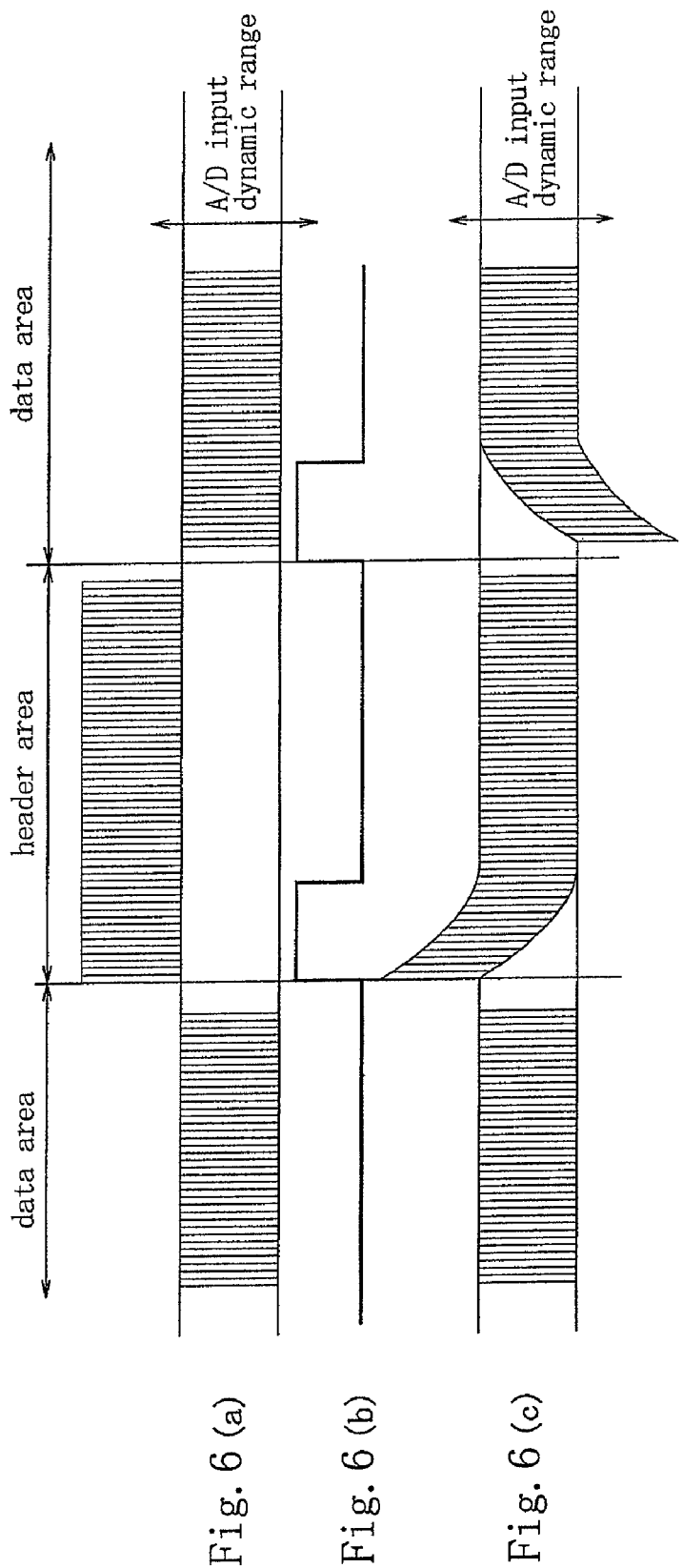
FIG. 6 is a diagram illustrating a reproduced signal from a DVD-RAM.
Figure 7:
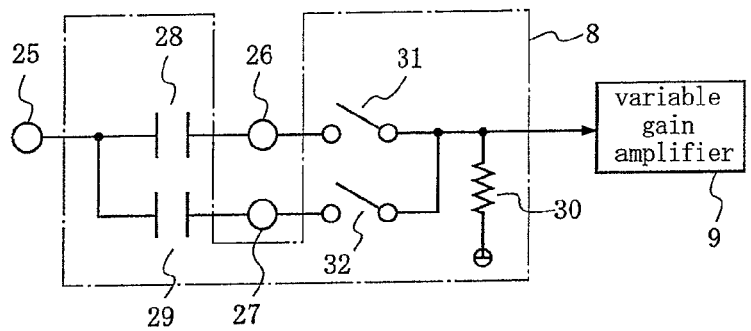
FIG. 7 is a diagram illustrating a configuration of a high-pass filter.
Figure 8:
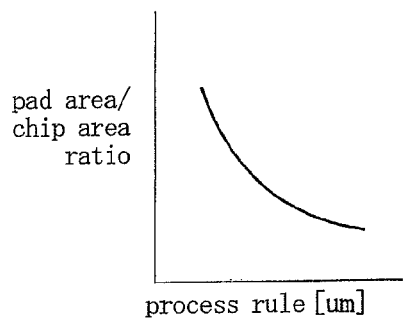
FIG. 8 is a graph showing the relation between the process rule and the ratio of chip area.
Figure 9:
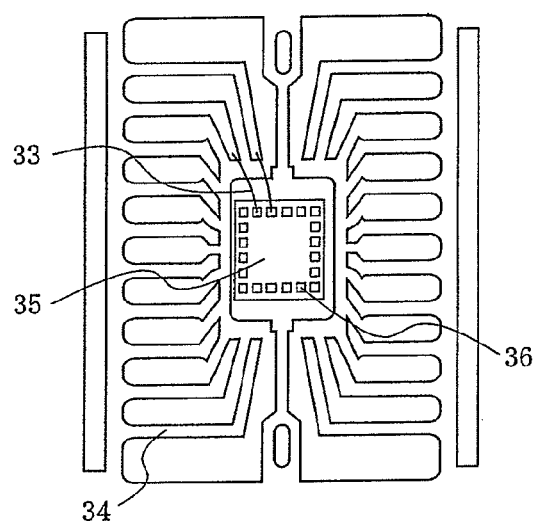
FIG. 9 is a diagram illustrating a lead frame and a semiconductor chip.
Figure 10:
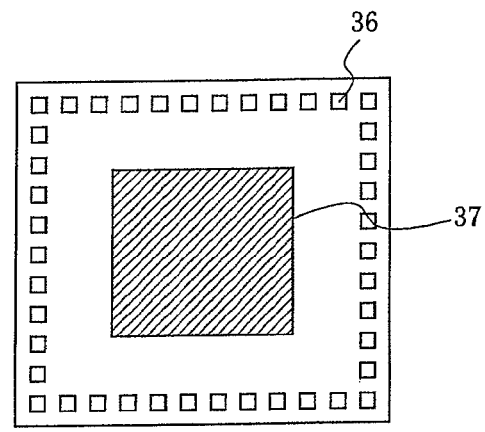
FIG. 10 is a diagram illustrating a semiconductor chip.

The signal shown in FIG. 6(a) is sampled by a clock having a predetermined clock period T to be converted into a quantized digital signal by the A/D converter 3. Since the input signal is not given an offset by the offset unit, it does not fall within the input dynamic range of the A/D converter 3, and the bright-side signal is undesirably saturated.

Figure 11:
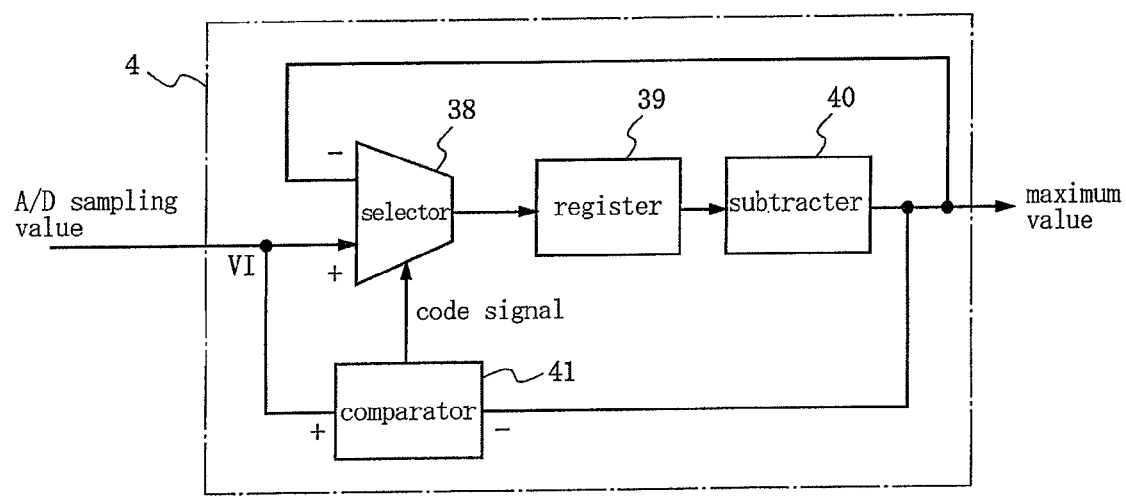
FIG. 11 is a block diagram illustrating a specific example of a peak detector.

Next, peak detection and bottom detection from the quantized digital signal are performed by the peak detector 4 and the bottom detector 5, respectively. As shown in FIG. 11, the peak detector 4 comprises a selector 38 which receives the output of the A/D converter 3 and the output of the peak detector 4, a register 39 which temporarily holds the value selected by the selector 38, a subtracter 40 which subtracts a predetermined value from the output of the register 39, and a comparator 41 which compares the output of the A/D converter 3 with the output of the peak detector 4. The sampling value that is one sample previous to the current sampling value, which is held in the register 39, is compared with the current sampling value by the comparator 41, and when the current sampling value is larger than the previous sampling value, the current sampling value is stored in the register 39, and otherwise, rewriting of the register 39 is not performed.

By continuously performing the above-mentioned operation, a peak of the digital signal is detected. In the present state, however, although the maximum value is detected, the bottom detection cannot follow an amplitude variation of the reproduced signal in the direction in which the amplitude is reduced. So, the predetermined value set in the subtracter 40 is subtracted from the value held in the register 39 for each interval of the predetermined clock by the subtracter 40, and when the current sampling value is smaller than the output of the subtracter 40, the value stored in the register 39 is rewritten with the output of the subtracter 40.

Figure 12:
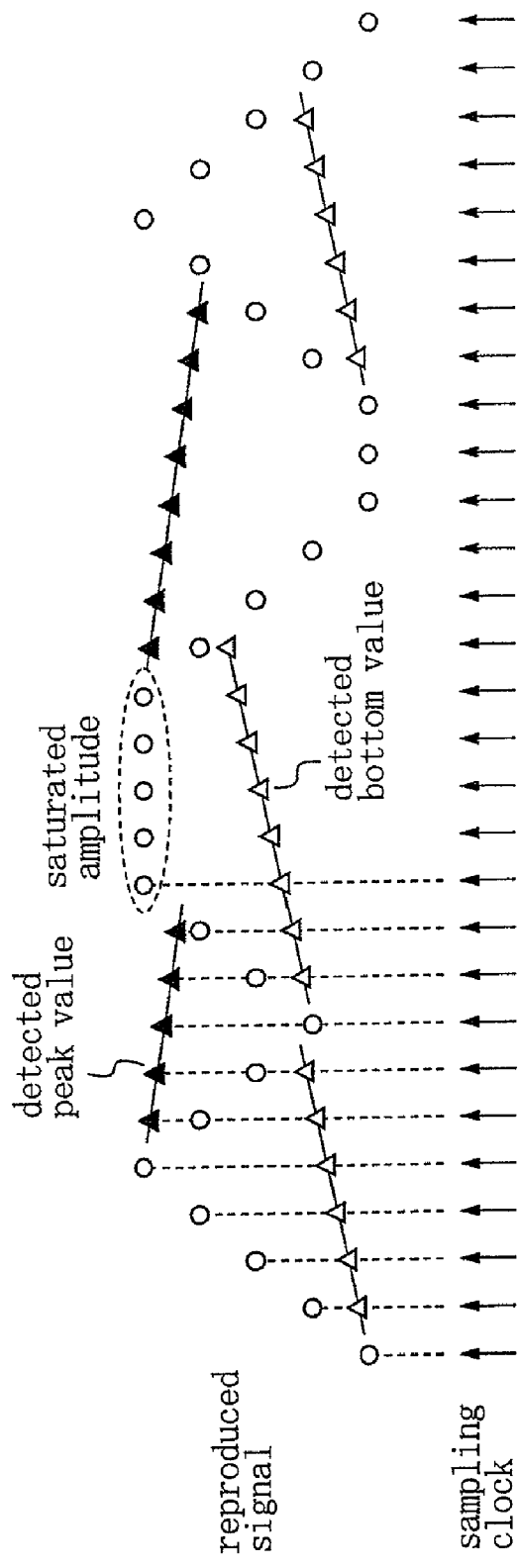
FIG. 12 is a block diagram illustrating the operation of the peak detector.

This operation can be concretely illustrated as shown in FIG. 12. In FIG. 12, "○" denotes the sampling values of the A/D converter 3, and "▲" shows the manner of subtracting the predetermined value for each clock after the peak detection. This subtraction amount is desired to be set so that it can follow the signal dropping speed when passing through a defect. Further, in the above description, the peak detector and the bottom detector are operated with the clock of the same period T as that for the A/D converter 3. However, since the modulation modes such as EFM and 8-16 modulation are adopted for a CD (Compact Disc) and a DVD (Digital Versatile Disc), respectively, the mark length varies from 3T to 11T or 14T (T: one period of clock), and the reproduced signal amplitude almost reaches its saturated state in a long mark of 5T or more. Therefore, as shown in FIG. 12, also when the peak detector 4 and the bottom detector 5 are operated with mT period and nT period, respectively (m, n are positive integers independent from each other, i.e., n is a positive integer different from m) or when both detectors are operated with nT (=mT) period (i.e., m, n are the same positive integer not less than 2), peak detection and bottom detection can be similarly carried out with no problem in practical use. In this way, by operating the peak detector and the bottom detector with the frequency-divided clock, a reduction in power consumption can be achieved.

Further, the operation of the bottom detector 5 can be realized by inverting the polarity of the operation of the peak detector 4. In this case, "Δ" in FIG. 12 shows the manner of increasing the predetermined value for each clock after the bottom detection.

Next, offset detection is performed from the detected peak value and the detected bottom value by the offset detector 6. This offset detection can be realized by detecting a sum of the peak value and the bottom value, or a difference in distance from the center level of the A/D conversion by the A/D converter 3, or whether the peak value and the bottom value are respectively within the predetermined window ranges or not. The detected offset is shown in FIG. 13.

Figure 13:
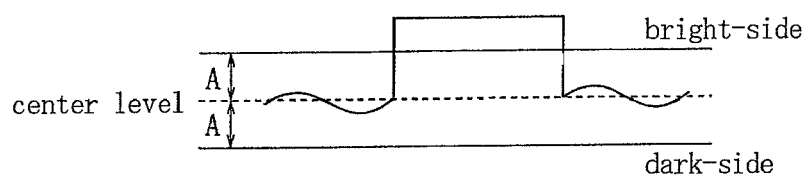
FIG. 13 is a diagram showing a detected offset value in the case where offset control is not performed.

Assuming that the center level is the target value, when a difference between the detected offset value and the center level is larger than the range A, if the offset is on the bright side as shown in FIG. 13, a control signal is transferred to lower the output signal offset of the first offset unit 1, and conversely, if the offset is on the dark side, a control signal is transferred to increase the output signal offset of the first offset unit 1. During this operation, the second offset unit 2 is not operated.

Further, when the difference between the detected offset value and the center level is smaller than the range A, the second offset unit 2 performs the same operation as the operation of the first offset unit 1. During this operation, the first offset unit 1 is not operated.

Figure 14:
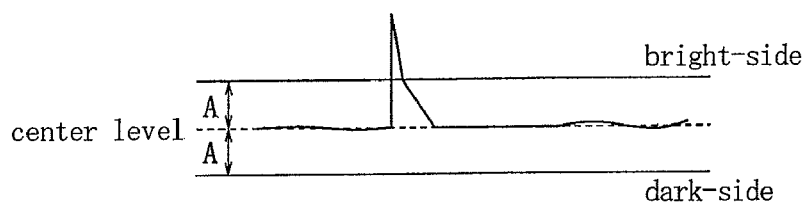
FIG. 14 is a diagram showing a detected offset value in the case where offset control is performed.

When the above-mentioned operation of the offset unit is performed, the offset under the state where the offset unit is not controlled (refer to FIG. 13) becomes as shown in FIG. 14.

In this first embodiment, when a large DC offset component is included in a signal that is outputted from an information recording medium such as a DVD-RAM format, the first offset unit performs drastic offset adjustment for pulling the header region deviating from the center into the center level, while the second offset unit performs relatively minute offset adjustment after the pull-in process.

There are problems of glitch and response speed as reasons for exclusively controlling the two types of offset units, i.e., the first offset unit and the second offset unit. The exclusive control is to control the two types of offset units such that only one of them gives an offset to an input signal while the other outputs an input signal as it is.

In this first embodiment, the optimum effect can be obtained when the first offset unit is used as an offset unit operating at a high speed while the second offset unit is used as an offset unit operating at a low speed.

Initially, the relation between the operating speed and the glitch will be described.

These offset units are configured by, for example, DA converters (hereinafter referred to as DAC). A glitch which is a spike-like noise occurs in an output of a DAC in accordance with code transition. In the case of an 8-bit DAC, since the number of switches which are switched inside the DAC is small when the code transits from 80 h (h expresses a hexadecimal number) to 81 h, the glitch occurs at a minute level.

Figure 15:
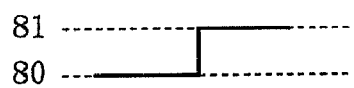
FIG. 15 is a diagram showing glitch of a DA converter.
Figure 15:
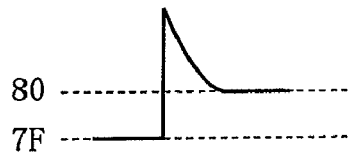

On the other hand, even in the same DAC, when the code transits from 80 h to 7 Fh, the glitch is significantly increased. Such glitch in the DAC output is shown in FIG. 15.

FIG. 15(a) shows the DAC output in which no glitch occurs, and FIG. 15(b) shows the DAC output in which glitch occurs.

As for glitch which occurs due to the code transition from 80 h to 7 Fh, i.e., which occurs at a point of ½ of the full scale, the amount of glitch becomes maximum because full-bit inversion occurs. An intermediate glitch smaller than this glitch occurs at a voltage of ¼ or ¾ of the full scale. The glitch in the DAC output is caused by charge/discharge due to switching of the gates in the DAC, or it is caused by that the data skews of eight control signals are not aligned in the case of the 8-bit DAC.

When such glitch occurs in the DAC output, since an abnormal signal is outputted at least temporarily, there is a possibility that a read error might occur when the quantized signal obtained in the A/D converter 3 is converted into a digital signal of 0/1 to be decoded as a signal ranging from 3T to 14T.

Figure 16:
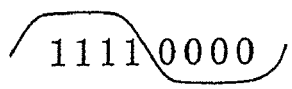
FIG. 16 is a diagram showing an error caused by the glitch.
Figure 16:
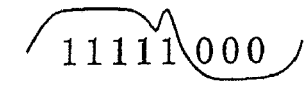

An example of such read error will be described with reference to FIG. 16. In the state where no glitch occurs as shown in FIG. 16(a), the quantized signal can be converted to "11110000". However, when glitch occurs as shown in FIG. 16(b), it is converted to "11111000", that is, a portion which should properly be read as "0" is incorrectly read as "1".

As a method for reducing such glitch, there is a method of passing the DAC output through a low-pass filter. However, when the DAC output is passed through the low-pass filter, the speed of changing the DAC output is undesirably lowered.

The DAC output which has been passed through a low-pass filter when reproducing the DVD-RAM format is shown in FIG. 17(a), and the DAC output which has not been passed through the low-pass filter is shown in FIG. 17(b). Although a DAC control signal shown in FIG. 17(c) is used for the both cases, the DAC output which has been passed through the low-pass filter takes a longer time to reach the center level.

Although it is necessary to read the address signal which is located at a position about ⅓ apart from the beginning of the CAPA section, when the DAC output is passed through the low-pass filter, the DC level does not reach the center level by the time the address position passes, and thus the address signal cannot be read.

Further, in a section where data are to be read, having less difference in DC offset component, a delay in the response speed due to the low-pass filter being mounted does not matter.

That is, when reproducing the DVD-RAM format, a high-speed operating DAC must be used to pull the CAPA section into the center level. Since such high-speed DAC has no countermeasure against glitch, glitch might occur in the DAC output, but such glitch which occurs in a region where data are not read does not matter.

Accordingly, the first offset unit provided with a DAC having no low-pass filter at its output is operated in a head portion 42 of the CAPA section where no data should be read or a head portion 43 of the DATA section after passage of the CAPA section, while the second offset unit provided with a DAC having a low-pass filter at its output is operated in the region 44 where data should be read, thereby to rapidly pull-in the DC offset component, and further, a DAC having no influence of glitch is used for minute offset control in the section where data should be read, thereby to efficiently perform offset control which is suitable to the input dynamic range of the A/D converter.

Further, if both the first offset unit and the second offset unit are operated in the state where the DC offset component is large, the feedback loop control is likely dispersed.

It is effective to have a function of operating the both DACs, as a risk management function against the case where the control of either of the DACs is fixed to the maximum value or the minimum value.

The operation of this risk management function is shown in FIG. 18. The second offset unit is operated while the first offset unit is not operated in the normal usage method. Although the above-described control is always possible for the usage within the assumed range, if a waveform outside the assumed range is inputted, the control signal of the second offset unit is saturated at (hereinafter referred to as "stuck to") the maximum value or the minimum value as shown in FIG. 18. In the following description, the state where the control signal is stuck to the maximum value is assumed. Upon detecting that the control signal of the second offset unit is stuck to the maximum value, a control signal for operating the first offset unit is outputted. The control signal to the first offset unit is controlled so as to increase the offset of the input signal to the A/D converter 3. By operating the first offset unit, the offset of the input signal to the A/D converter 3 is brought near to the center level. When it is near the center level, the offset detection signal and the center level are almost equal to each other, and thereby the DAC control signal turns upward and downward. When it is detected that the second offset unit which should properly be operated is recovered from the state where its control signal is stuck to the maximum value, the operation of the first offset unit is halted.

Since the first offset unit is operated in the section where data should be read, it is undeniable that glitch is superimposed onto the DAC output. However, even when a signal outside the assumed range might arrive, the offset can be brought to the center level by operating the first offset unit which is not usually used, and thus the temperature range of the operating environment of the optical disc reproducing apparatus and the reproduction margin for the case of reproducing an inferior disc can be extended.

As described above, according to the first embodiment, the first offset unit 1 which gives a DC offset according to an offset control signal to a reproduced signal input, and the second offset unit 2 which receives the output of the first offset unit 1 as an input signal and gives a DC offset according to an offset control signal to the input signal are provided in the stage previous to the A/D converter 3, and an offset in the input signal to the A/D converter 3 is detected based on the peak detection result and the bottom detection result from the output of the A/D converter 3, and then the controller 7 exclusively controls the first offset unit 1 and the second offset unit 2 according to the offset information signal as the result of the offset detection. Therefore, the whole signal processing device can be fabricated on an LSI, and a difference in DC component can be absorbed without the necessity of having externally-attached elements, and increasing the number of terminals.

Embodiment 2

A second embodiment corresponds to the inventions disclosed in Claims 3, 4, 5, and 6, wherein the first and second offset units are exclusively controlled based on the offset information that is detected from the sampling data outputted from the A/D converter 3, thereby enabling absorption of a DC offset component without increasing the number of terminals, and inputting of the signal within the input dynamic range of the A/D converter.

Figure 19:
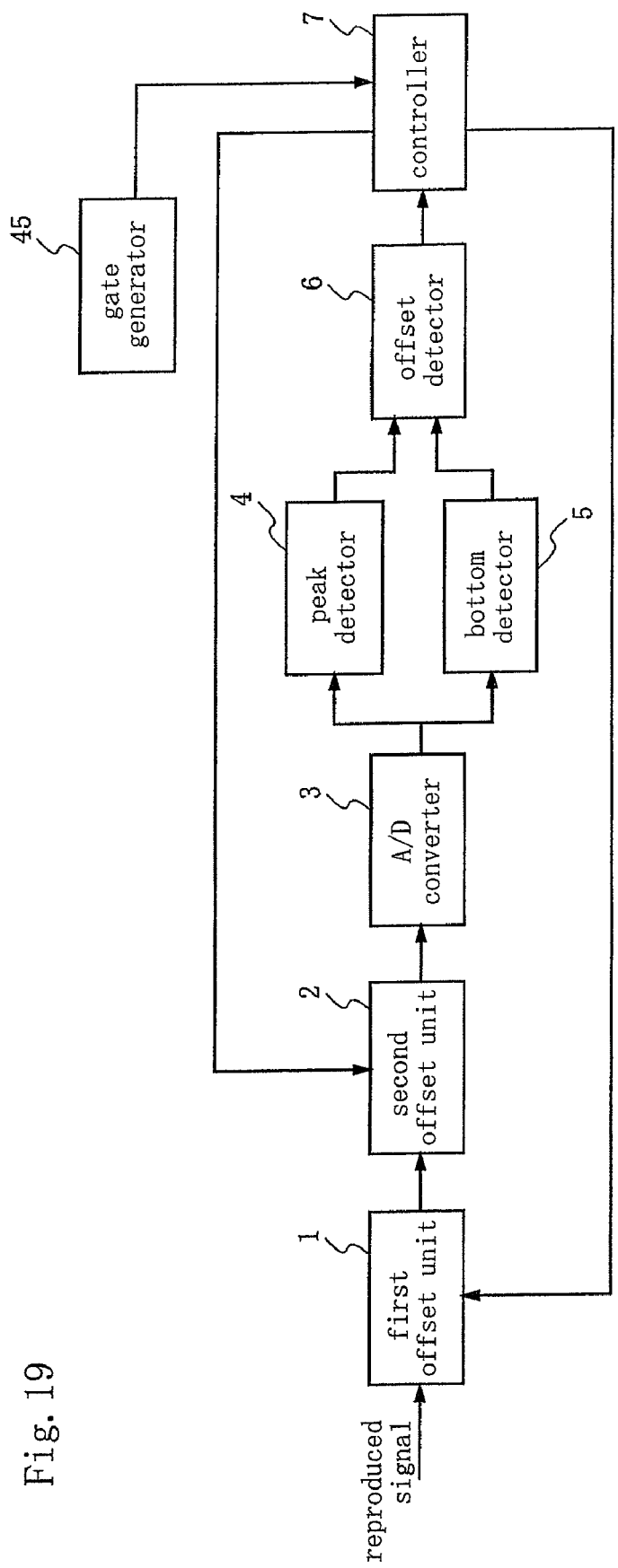
FIG. 19 is a block diagram of a signal processing device according to a second embodiment of the present invention.

Hereinafter, the second embodiment of the present invention will be described in detail with reference to the drawings. FIG. 19 is a block diagram of a signal processing device of this second embodiment.

The signal processing device comprises a first offset unit 1 which gives a DC offset according to an offset control signal to a reproduced signal input, a second offset unit 2 which receives an output of the first offset unit 1 as an input signal and gives a DC offset according to an offset control signal to the input signal, an A/D converter 3 which receives an output of the second offset unit 2 as an input signal, and analog-to-digital converts the input signal by sampling the same with a clock of a predetermined clock period T to output sampling data, a peak detector 4 which receives an output of the A/D converter 3 and performs peak detection with a clock of a period that is m times (m: positive integer) of the above-mentioned clock period, a bottom detector 5 which receives an output of the A/D converter 3 and performs bottom detection with a clock of a period that is n times (n: positive integer) of the above-mentioned clock period, an offset detector 6 which receives an output of the peak detector 4 and an output of the bottom detector 5, and calculates a signal offset in the input signal to the A/D converter 3 to output an offset information signal, a gate generator 45 which generates a gate signal, and a controller 7 which exclusively controls the offset controls of the first offset unit 1 and the second offset unit 2 according to the offset information signal and the gate signal.

Next, the operation of the second embodiment will be described.

After the reproduced signal from the information recording medium is given the offsets according to the control inputs in the first offset unit 1 and the second offset unit 2, respectively, it is sampled with the clock of the predetermined clock period T by the A/D converter 3 to be converted into a quantized digital signal. For simplification, a description will initially be given of the operation in the state where the reproduced signal is input to the A/D converter 3 without being given the offsets in the first offset unit 1 and the second offset unit 2.

It is assumed that the input signal is a reproduced signal of a DVD-RAM format which is a kind of an optical disc. When reproducing an optical disc of the DVD-RAM format, a signal as shown in FIG. 6(a) is input to the A/D converter 3.

The signal shown in FIG. 6(a) is sampled by a clock having a period T to be converted into a quantized digital signal by the A/D converter 3. Since the input signal is not given offsets in the offset units, it does not fall within the input dynamic range of the A/D converter 3, and the bright-side signal is saturated.

Next, peak detection and bottom detection from the quantized digital signal are performed by the peak detector 4 and the bottom detector 5, respectively. The peak detection and the bottom detection are identical to those described for the first embodiment, and both may be performed with a clock of the same period as the predetermined clock period T. However, peak detection and bottom detection can be similarly performed by operating the peak detector 4 and the bottom detector 5 with mT period and a nT period, respectively (m, n are positive integers independent from each other, i.e., n is a positive integer different from m) or by operating both detectors with nT (=mT) period (i.e., m, n are the same positive integer not less than 2), thereby realizing a reduction in power consumption.

Next, offset detection from the detected peak value and the detected bottom value is performed by the offset detector 6. This offset detection can be realized by detecting a sum of the peak value and the bottom value, or a difference in distance from the A/D center level, or whether the peak value and the bottom value are respectively within the predetermined window ranges or not.

The offset thus detected is shown in FIG. 13.

Next, the gate signal generated by the gate generator 45 is input to the controller 7, and a control signal which controls the first offset unit and the second offset unit so that these offset unit are exclusively operated is outputted from the controller 7.

Next, the gate generator 45 and the gate signal outputted from the gate generator 45 will be described.

The gate generator 45 comprises, as shown in FIG. 20, an address position detector 46 which detects an address position based on a binarized signal decoded to 0/1 after the reproduced signal has been converted into a digital signal, a sector counter 47 which counts a section corresponding to one sector, using a reproduction clock that is synchronized with the phase of the clock component possessed by the reproduced signal, with reference to the detected address position, and a prediction gate generator 48 which generates a gate at a position of next address information that is predicted by the sector counter 47.

By efficiently controlling the first offset unit and the second offset unit using the gate generator 45, offset adjustment can be performed without being affected by defect or disordered tracking servo.

Next, specific methods for generating and using the gate signal will be described.

FIG. 21(a) shows a DVD-RAM recording format. As shown in FIG. 21(a), each sector is divided into an address block as an emboss area in which address information of the sector is recorded, and a data block in which random data can be rewritten.

In FIG. 21(a), VFO (Variable Frequency Oscillator) is a region where 4T (T: minimum recording unit time) patterns are continuously recorded, and it is used for phase sync pull-in or the like. AM is an address mark, and a sync pattern represented by 14T+4T is included in the AM in the DVD. ID is a region where the address information of the corresponding sector is recorded, and four IDs exist in the address block while one ID exists in the data block. PS in the data block is called "pre sync", and a sync pattern is included in the PS.

Description will be advanced assuming that the gate signal of this embodiment drives the first offset unit when it is H, and drives the second offset unit when it is L.

The gate signal shown in FIG. 21(c) is a gate signal which becomes H in the address block and L in the data block. In the H section, i.e., in the address block, the first offset unit characterized by high-speed operation is operated, and thereby the DC offset at the time when the signal goes into the CAPA section can be rapidly pulled in the center level.

In the L section, the second offset unit which performs low-speed operation but does not cause glitch is operated to perform offset adjustment. Since the purpose is offset adjustment for the signal that is pulled in almost the center, the low-speed operation has no problem.

FIG. 21(b) shows a gate signal which is outputted with a region that must be read being an L section and a region that is not required to be read being an H section in the reproduced signal.

Using the gate signal shown in FIG. 21(b), the first offset unit capable of high-speed operation is operated during the H section, and thereby the DC offset at the time of going into the CAPA section can be rapidly pulled in the center level. Even if the above-mentioned glitch occurs, since the H section is not to be read, the glitch does not affect the operation.

In the L section, the second offset unit which performs low-speed operation but does not cause glitch can be operated. Since the purpose is offset adjustment for the signal that is pulled in almost the center, the offset unit performing low-speed operation does not matter.

Further, it is effective to switch the control method between the state where the address position is acquired with stability and the unstable state before the acquisition of the address position.

As shown in FIG. 22, a selector 49 is provided in the controller 7, and a signal serving as an index for address acquisition (address acquisition signal) which becomes H when address acquisition has succeeded and L when address acquisition has failed continuously twice is input to the selector 49, and the selector 49 is set up so as to select the gate signal A generated by the gate generator 45 when the address acquisition signal is L, and the gate signal B generated by the gate generator 45 when it is H.

As a specific example, the operation in the case where the gate signal A inputted to the selector 49 is the gate signal shown in FIG. 21(c) and the gate signal B is the gate signal shown in FIG. 21(b) will be described.

Since data are read in the state where an address can be obtained, it is not necessary to read the signal in the state where no address is obtained. Accordingly, the DC offset can be pulled in the center level more rapidly by using the gate signal shown in FIG. 21(c) which operates the first offset unit that performs high-speed operation while glitch is superposed in its output, for a longer section. Even the signal on which the glitch is superposed does not affect the operation because data are not read. Further, after the address acquisition, the second offset unit is operated using the gate signal shown in FIG. 21(b) when reading the address information in the address block, and thereby superposition of glitch can be avoided.

As described above, according to the second embodiment, the gate generator 45 for generating a gate signal is further added to the configuration of the first embodiment, and the controller 7 exclusively controls the offset controls of the first and second offset units based on the gate signal as well as the offset information signal, and thereby a difference in DC component can be absorbed without increasing the number of terminals. Further, a gate signal is generated by the gate generation so that the first offset unit which is capable of high-speed operation is operated in the address block in the reproduced signal while the second offset unit which performs low-speed operation but does not cause glitch is operated in the data block, and thereby a DC offset at the time of going into the CAPA section can be rapidly pulled in the center level.

Embodiment 3

A third embodiment corresponds to the inventions of Claim 7 and Claim 8, wherein the first and second offset units are exclusively controlled based on the offset information that is detected from the sampling data outputted from the A/D converter 3, thereby enabling absorption of a DC offset component without increasing the number of terminals, and inputting of the signal within the input dynamic range of the A/D converter. Further, a storage unit is provided to hold a control value for the offset unit, thereby realizing efficient operation.

Figure 23:
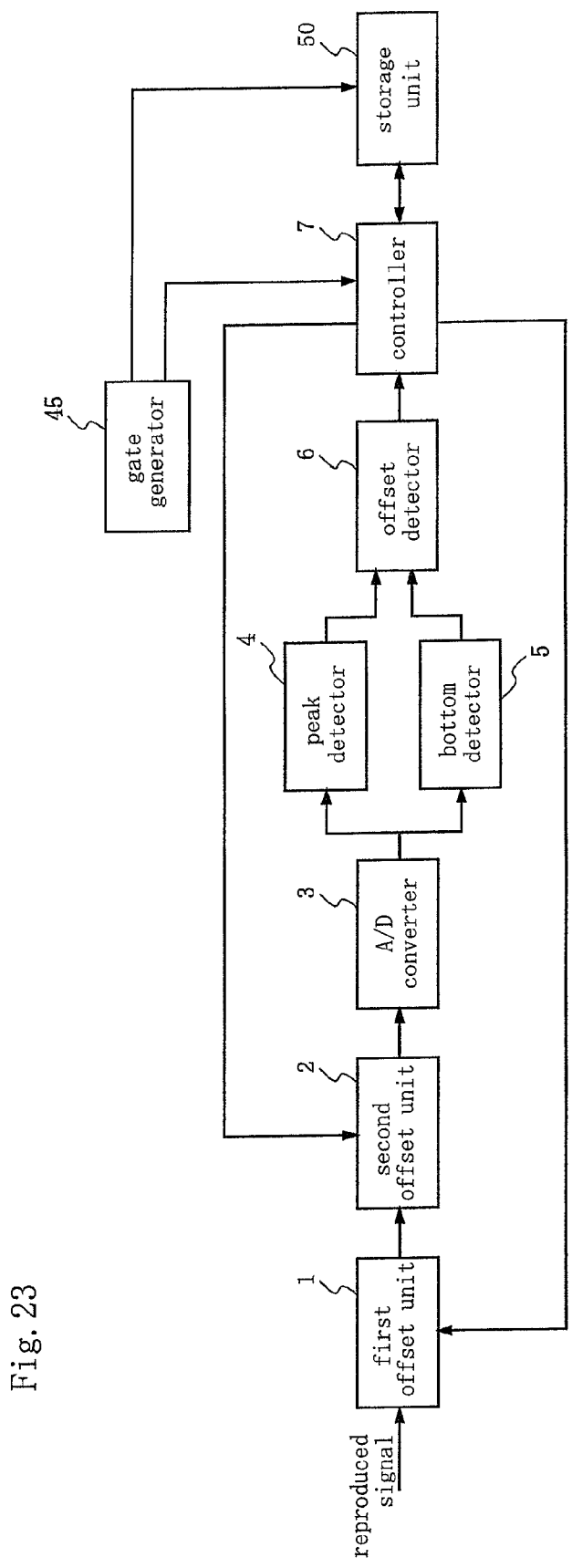
FIG. 23 is a block diagram of a signal processing device according to a third embodiment of the present invention.

Hereinafter, the third embodiment of the present invention will be described in detail with reference to the drawings. FIG. 23 is a block diagram of a signal processing device of the third embodiment.

This signal processing device comprises a first offset unit 1 which gives a DC offset according to an offset control signal to a reproduced signal input, a second offset unit 2 which receives an output of the first offset unit 1 as an input signal and gives a DC offset according to an offset control signal to the input signal, an A/D converter 3 which receives an output of the second offset unit 2 as an input signal, and analog to digital convert the input signal by sampling the same with a clock of a predetermined clock period T to output sampling data, a peak detector 4 which receives an output of the A/D converter 3 and performs peak detection with a clock of a period that is m times (m: positive integer) of the above-mentioned clock period, a bottom detector 5 which receives the output of the A/D converter 3 and performs bottom detection with a clock of a period that is n times (n: positive integer) of the above-mentioned clock period, an offset detector 6 which receives an output from the peak detector 4 and an output from the bottom detector 5, and calculates a signal offset in the input signal to the A/D converter 3 to output an offset information signal, a gate generator 45 which generates a gate signal, a controller 7 which exclusively controls the offset controls of the first offset unit 1 and the second offset unit 2 according to the offset information signal and the gate signal, and a storage unit 50 which holds information of a control signal outputted from the controller, and controls the held information to be input to the controller 7 in accordance with the gate signal outputted from the gate generator 45.

By adopting the above-described configuration, when a reproduced signal including a steep difference in DC component is inputted, the difference in DC component can be absorbed without increasing the number of LSI terminals. Further, since the control amount of the offset unit is held in the storage unit 50, the time required until the difference in DC component is pulled in the center level can be reduced.

Figure 24:
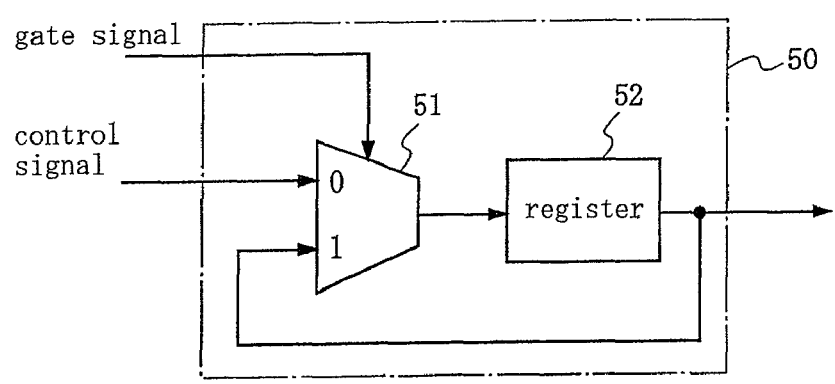
FIG. 24 is a diagram illustrating a specific example of a storage unit.
Figure 24:
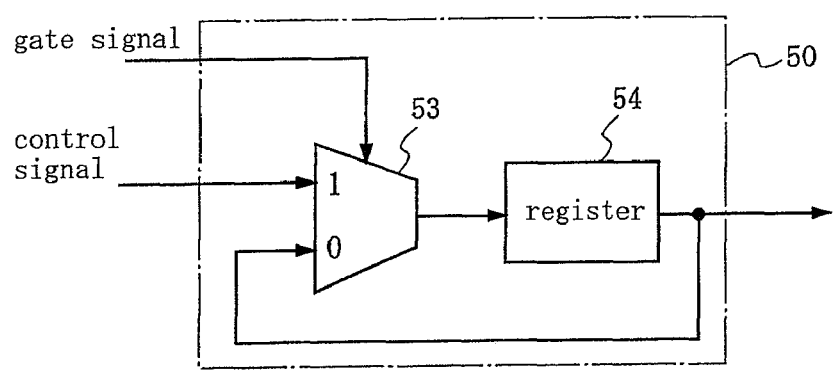

As shown in FIG. 24(a), when the input gate signal is "0", the selector 51 selects the control signal supplied from the controller 7 and writes the same in the register 52, and the register 52 outputs the written control signal as a control signal a. When the gate signal is "1", the control signal stored in the register, which has been written under the state where the gate signal was "0", is held.

Conversely, as shown in FIG. 24(b), when the input gate signal is "1", the selector 53 selects the control signal supplied from the controller 7, and writes the same in the register 54. The register 54 outputs the written control signal as a control signal b. When the gate signal is "0", the control signal stored in the register 54, which has been written under the state where the gate signal was "1", is held. The transfer of the control signal from the storage unit to the control unit is performed only at rising edges and falling edges of the gate signal. As for the control signals under the state where the gate signal is L, the information of the last control signal is transmitted to the first control signal in the next L state.

The same can be said for the state where the gate signal is H.

Next, the operation of this third embodiment will be described.

The reproduced signal from the information recording medium is given the offsets according to the control signals by the first offset unit 1 and the second offset unit 2, respectively, and then sampled with a clock of a predetermined clock period T to be converted into a quantized digital signal by the A/D converter 3.

Next, peak detection and bottom detection from the quantized digital signal is performed by the peak detector 4 and the bottom detector 5, respectively. The peak detection and bottom detection are identical to those described for the first embodiment, and both of them may be performed with a clock of the same period as the clock of the predetermined clock period T. However, peak detection and bottom detection can be similarly performed by operating the peak detector 4 and the bottom detector 5 with mT period and nT period, respectively (m, n are positive integers independent from each other, i.e., n is a positive integer different from m) or by operating both detectors with nT (=mT) period (i.e., m, n are the same positive integer not less than 2), thereby realizing a reduction in power consumption.

Next, offset detection from the detected peak value and the detected bottom value is performed by the offset detector 6. The offset detection can be performed by detecting a sum of the peak value and the bottom value, or a difference in distance from the A/D center level, or whether the peak value and the bottom value are respectively included within the predetermined window ranges or not.

The detected offset is shown in FIG. 13.

Next, the gate signal generated by the gate generator 45 is input to the controller 7, and the control signals for controlling the exclusive operations of the first offset unit and the second offset unit are outputted from the controller 7.

Although the gate signal of the type described in the second embodiment can be adopted as the gate signal to be outputted from the gate generator 45, in this third embodiment a gate signal expressing a DATA section and a CAPA section as shown in FIG. 21(c) is adopted, assuming the case of reproducing a DVD-RAM format. The first offset unit is operated when the gate signal is H, and the second offset unit is operated when the gate signal is L.

Figure 25:
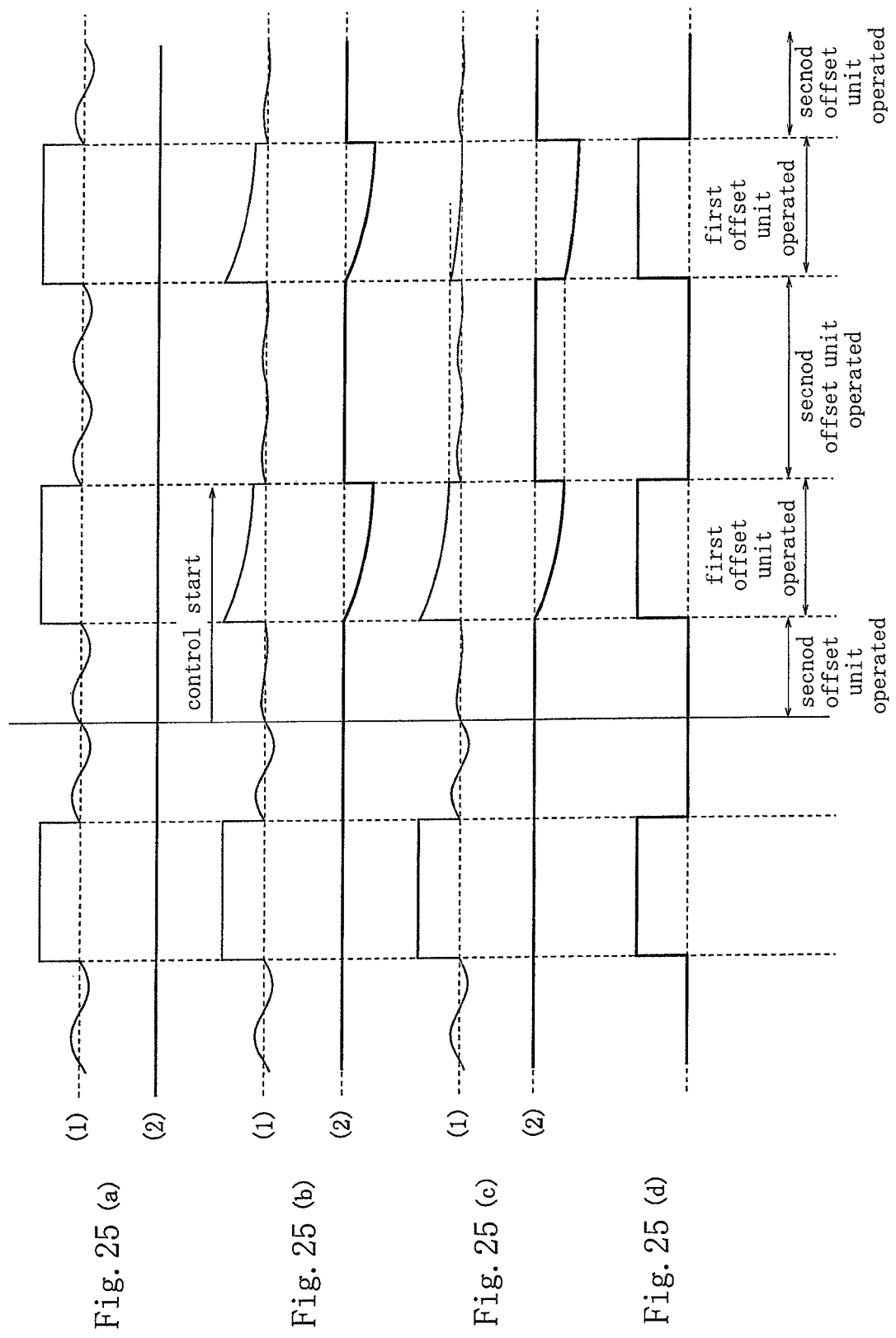
FIG. 25 is a time chart for explaining the operation of the signal processing device of the third embodiment.

FIG. 25 shows the operation when control is performed using the storage unit and the operation when control is performed without the storage unit. Hereinafter, description will be focused on the operation of the first offset control.

First of all, (1) in FIG. 25(a) shows a detected offset value in the state where the control of the first offset unit is held, and (2) in FIG. 25(a) shows a control value to the first offset unit at that time. Since the first offset unit is continuously in the held state, the control value is also constant.

Next, (1) in FIG. 25(b) shows a detected offset value in the state where offset control is operated while the storage unit 50 is not used. When control is started, since the second offset unit is controlled in the section where the gate signal shown in FIG. 25(d) is L, the detected offset value also approaches the center. Next, since the first offset unit is controlled in the section where the gate signal is H, the detected offset value also approaches the center. The offset control value shown by (2) in FIG. 25(b) also varies downward. In the next section where the gate signal is L, since the second offset unit is operated, the first offset control value does not vary.

The first offset control is reset to the initial value because an unnecessary variation different from that in the previous L section might occur in the offset at the output, unless the first offset control is made similar to the second offset control at the same time when the second offset control starts to operate, i.e., at the falling edge of the gate signal. Since the initial value is held as it is during the section where the gate signal L, when the second gate signal from starting the control goes into the H section, the control again starts from the initial value.

Next, the operation of this third embodiment using the storage unit 50 will be described. In FIG. 25(c), (1) shows a detected offset value in the case of using the storage unit 50. When control is started, since the second offset unit is controlled in the section where the gate signal is L as shown in FIG. 25(d), the detected offset value also approaches the center by performing the control. Next, since the first offset unit is controlled in the section where the gate signal is H, the detected offset value also approaches the center. The controlled offset value shown by (2) in FIG. 25(c) also varies downward. Since the second offset unit is operated in the next section where the gate signal is L, the first offset control value does not vary.

The first offset control is reset to the initial value because an unnecessary variation different from that in the previous L section might occur in the offset at the output, unless the first offset control is made similar to the second offset control at the same time when the second offset control starts to operate, i.e., at the falling edge of the gate signal. The initial value is held as it is during the section where the gate signal L. When the second gate signal from starting the next control goes into the H section, the last control signal in the previous H section is outputted, and thereby the detected offset value soon reaches near the center as shown in (1) of FIG. 25(c) although it does not reach near the center in (1) of FIG. 25(b).

This third embodiment has an advantage that the time required until the offset is pulled in the center level can be reduced after the offset control value is learned, while in the conventional art the time equivalent to the time constant determined by the analog circuit is always required every time for pulling the offset in the center level.

As described above, according to the third embodiment, since the storage unit 50 which controls the stored information to be input to the control unit in accordance with the gate signal outputted from the gate generator 45 is provided in addition to the configuration of the second embodiment, a difference in DC component can be absorbed without increasing the number of terminals. Further, since the control signals generated by the controller are stored in the storage unit, the time required until the DC offset is pulled in the center level can be reduced.

Embodiment 4

A fourth embodiment corresponds to the inventions, wherein a hold signal is input to the control unit of the first embodiment to enable holding of control operation or switching of control speed.

Figure 26:
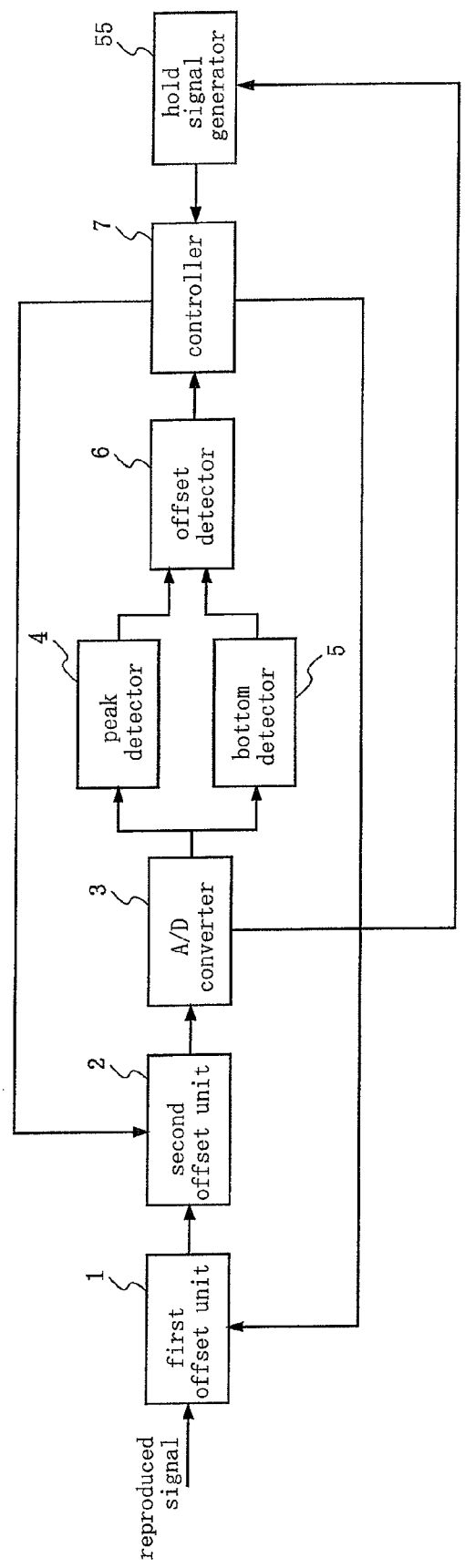
FIG. 26 is a block diagram of a signal processing device according to a fourth embodiment of the present invention.

Hereinafter, the fourth embodiment of the present invention will be described in detail with reference to the drawings. FIG. 26 shows a block diagram of a signal processing device of this fourth embodiment.

This signal processing device comprises a first offset unit 1 which gives a DC offset according to an offset control signal to a reproduced signal input, a second offset unit 2 which receives an output of the first offset unit 1 as an input signal and gives a DC offset according to an offset control signal to the input signal, an A/D converter 3 which receives an output of the second offset unit 2 as an input signal, and analog-to-digital converts the input signal by sampling the same with a clock of a predetermined clock period T to output sampling data, a peak detector 4 which receives an output of the A/D converter 3 and performs peak detection with a clock of a period that is m times (m: positive integer) of the above-mentioned clock period, a bottom detector 5 which receives an output of the A/D converter 3 and performs bottom detection with a clock of a period that is n times (n: positive integer) of the above-mentioned clock period, an offset detector 6 which receives an output from the peak detector 4 and an output from the bottom detector 5, and calculates a signal offset in the input signal to the A/D converter 3 to output an offset information signal, a hold signal generator 55 which holds the output signal from the A/D converter 3, and a controller 7 which exclusively controls the offset controls of the first offset unit 1 and the second offset unit 2 according to the offset information signal outputted from the offset detector 6, and can hold the control operation or switch the control speed according to the input hold signal.

Next, the operation of this fourth embodiment will be described.

The reproduced signal from the information recording medium is given offsets according to the control inputs by the first offset unit 1 and the second offset unit 2, and then sampled with a clock of a predetermined clock period T to be converted into a quantized digital signal by the A/D converter 3.

Next, peak detection and bottom detection from the quantized digital signal are performed by the peak detector 4 and the bottom detector 5, respectively. The peak detection and bottom detection operations are identical to those of the first embodiment, and both may be performed with a clock of the same period as the clock of the predetermined clock period T. However, peak detection and bottom detection can be similarly performed by operating the peak detector 4 and the bottom detector 5 with mT period and nT period, respectively (m, n are positive integers independent from each other, i.e., n is a positive integer different from m) or by operating both detectors with nT period (i.e., m, n are the same positive integer not less than 2), thereby realizing a reduction in power consumption.

Next, offset detection from the detected peak value and the detected bottom value is performed by the offset detector 6. Offset detection can be performed by detecting a sum of the peak value and the bottom value, or a difference in distance from the A/D center level, or whether the peak value and the bottom value are respectively within the predetermined window ranges or not.

The detected offset is shown in FIG. 13.

Next, the hold signal generated by the hold signal generator 55 is input to the controller 7. While in this fourth embodiment the output signal from the A/D converter 3 is input to the hold signal generator 55, at least one of the output from the bottom detector 5, the output from the peak detector 4, and the amplitude information signal which is obtained by calculation between the output from the bottom detector 5 and the output from the peak detector 4 may be input to the hold signal generator 55, and the hold signal which detects a missing part of the input signal may be input to the controller 7. Further, a signal which is generated when externally detecting a defect may be adopted. Alternatively, a signal which is externally inputted not when a defect or the like is detected but when holding of the operation is required may be adopted.

As described above, according to the fourth embodiment, the hold signal generator 55 for holding the output signal from the A/D converter 3 is further provided in addition to the configuration of the third embodiment, and the controller 7 is configured to perform holding of the control operation or switching of the control speed according to the input hold signal. Thereby, a difference in DC component can be absorbed without increasing the number of terminals, and a phenomenon that the control signal exceeds the input dynamic range of the A/D converter 3 after passing through a defect can be suppressed by detecting a local variation of the reproduced signal by the hold signal generator to hold the offset control or change the control response speed, and thus the signal amplitude and offset in the input signal to the A/D converter 3 can always be kept almost constant. Therefore, it is possible to resolve the problem that data reproduction cannot be correctly performed because excessive time is required until the reproduced signal falls within the input dynamic range of the A/D converter 3 to be pulled in the normal state after passing through a signal missing part, resulting in an effect that can minimize a data error after passing through a defect.

Embodiment 5

Figure 27:
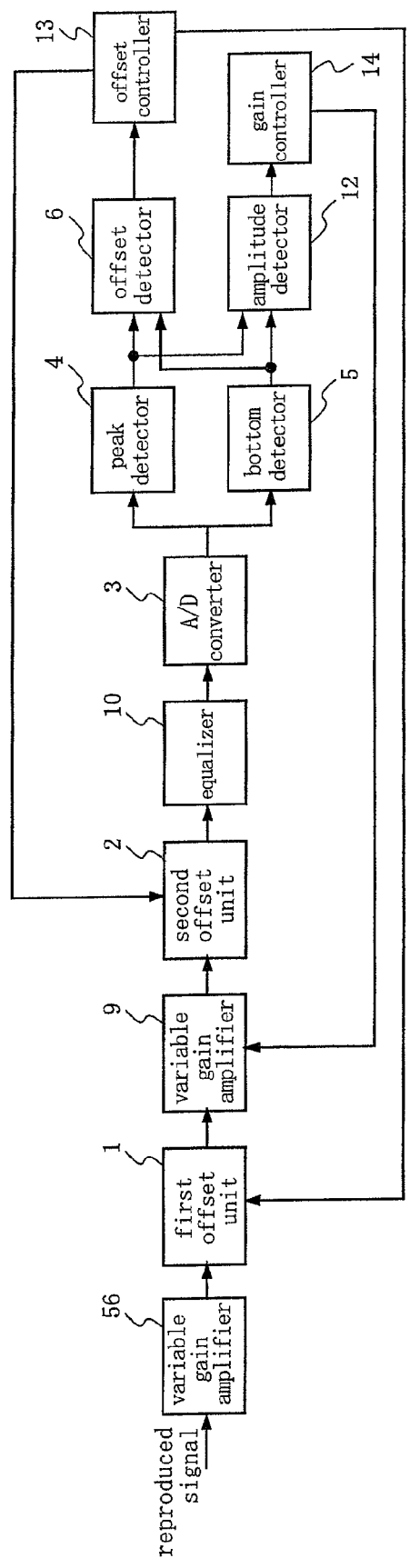
FIG. 27 is a block diagram of a signal processing device according to a fifth embodiment of the present invention.

A fifth embodiment corresponds to the invention, and provides a more specific configuration of the first embodiment. Hereinafter, the fifth embodiment will be described in detail with reference to the drawings. FIG. 27 shows a block diagram of a signal processing device according to the fifth embodiment.

This signal processing device comprises a variable gain amplifier 56 which give a gain according to a set value to a reproduced signal input, a first offset unit 1 which receives an output from the variable gain amplifier 56 as an input signal and gives a DC offset according to an offset control signal to the input signal, a variable gain amplifier 9 which receives an output from the first offset unit 1 as an input signal and gives a gain according to a gain control signal to the input signal, a second offset unit 2 which receives an output from the variable gain amplifier 9 as an input signal and gives a DC offset according to an offset control signal to the input signal, an equalizer 10 which receives an output from the second offset unit 2 and emphasizes a high-frequency band thereof, an A/D converter 3 which receives an output from the equalizer 10 as an input signal, and analog-to-digital converts the input by sampling the same with a clock of a predetermined clock period T to output sampling data, a peak detector 4 which receives an output from the A/D converter 3 and performs peak detection with a clock of a period that is m times (m: positive integer) of the above-mentioned clock period, a bottom detector 5 which receives an output from the A/D converter 3 and performs bottom detection with a clock of a period that is n times (n: positive integer) of the above-mentioned clock period, an offset detector 6 which receives an output from the peak detector 4 and an output from the bottom detector 5, and calculates a signal offset in the input signal to the A/D converter 3 to output an offset information signal, an amplitude detector 1 which receives the output from the peak detector 4 and the output from the bottom detector 5, and calculates a signal amplitude in the input signal to the A/D converter 3 to output an amplitude information signal, a gain controller 14 which controls the variable gain amplifier 9 according to the magnitude relation between the amplitude information signal and a target amplitude value, and an offset controller 13 which controls the first and second offset units according to the magnitude relation between the offset information signal outputted from the offset detector 6 and a target offset value.

Next, the operation of the fifth embodiment will be described.

The reproduced signal from the information recording medium is transferred to the variable gain amplifier 56, and amplified by a gain that is set in the variable gain amplifier 56. It is assumed that the variable gain amplifier 56 is used to absorb variations in the optical pickup and variations in differences among information recording media. The gain to be set in the variable gain amplifier 56 is determined from the initially learned values of a recorded information reproducing apparatus and the evaluated values at the time of development of the reproducing apparatus.

Then, variations in the pickup and the information recording media are absorbed to some extent, the output from the variable gain amplifier 56, which is within the reference amplitude range, is input to the first offset unit 1, an offset according to a control signal is given to the input signal in the first offset unit 1, a gain according to a gain control signal is given to the input signal in the variable gain amplifier 9, and an offset according to an offset control signal is given to the input signal in the second offset unit 2, and then waveform equalization is performed by the equalizer.

When reproducing a high-density recorded optical recording medium, since the signal amplitudes of relatively short recording marks are degraded due to the optical frequency characteristics, the SNR (Signal to Noise Ratio) must be improved by boosting up the frequency band by the equalizer 10. Further, the output from the equalizer 10 is sampled with a clock of a predetermined clock period T to be converted into a quantized digital signal by the A/D converter 3.

Next, peak detection and bottom detection from the quantized digital signal are performed by the peak detector 4 and the bottom detector 5, respectively.

The peak detection and bottom detection operations are identical to those of the first embodiment, and both may be performed with a clock of the same period as the clock of the predetermined clock period T. However, peak detection and bottom detection can be similarly performed by operating the peak detector 4 and the bottom detector 5 with mT period and nT period, respectively (m, n are positive integers independent from each other, i.e., n is a positive integer different from m) or by operating both detectors with nT period (i.e., m, n are the same positive integer not less than 2), thereby realizing a reduction in power consumption.

Further, amplitude detection is performed by the amplitude detector 12. For example, amplitude detection is realized by calculating a difference between the peak value and the bottom value.

The operation of the offset controller 13 is identical to that of the first embodiment.

The gain controller 14 compares the detected amplitude value with a predetermined target amplitude value. When the detected amplitude value is smaller than the target value, the gain controller 14 outputs a control signal to increase the gain of the variable gain amplifier 9, and when the detected amplitude value is larger than the target value, it outputs a control signal to reduce the gain of the variable gain amplifier 9.

While it is desired that the signal amplitude in the equalizer 10 should be passed at its maximum amplitude within the dynamic range of the equalizer 10 from the viewpoint of SNR (Signal to Noise Ratio), the input signal amplitude and the input signal offset of the equalizer 10 can be controlled to be constant by placing the equalizer 10 in the previous stage of the A/D converter 3 as in this fifth embodiment. Thereby, the maximum SNR can be ensured, and it becomes unnecessary to consider a variation margin such as a circuit offset that occurs at the previous stage of the equalizer 10, and therefore, the signal of the maximum amplitude within the dynamic range of the equalizer can be inputted.

As described above, according to the fifth embodiment, the variable gain amplifier 56 which gives a gain according to a set value to a reproduced signal input, the first offset unit 1 which receives an output from the variable gain amplifier 56 as an input signal and gives a DC offset according to an offset control signal to the input signal, the variable gain amplifier 9 which receives an output from the first offset unit 1 as an input signal and gives a gain according to a gain control signal to the input signal, the second offset unit 2 which receives an output from the variable gain amplifier 9 as an input signal and gives a DC offset according to an offset control signal to the input signal, and the equalizer 10 which receives an output from the second offset unit 2 as an input signal and emphasizes the high-frequency band thereof, are provided in the previous stage of the A/D converter 3, and an offset and an amplitude in the input signal to the A/D converter 3 are detected based on the peak detection result and the bottom detection result from the output of the A/D converter 3, the offset controller 13 exclusively controls the first offset unit 1 and the second offset unit 2 according to the offset information signal as its detection result, and the gain controller 14 controls the gain of the variable gain amplifier 9 according to the magnitude relation between the amplitude information signal as its detection result and the target amplitude value. Therefore, a difference in DC component can be absorbed without increasing the number of terminals, and the individual variability of the optical pickup or the information recording medium can be absorbed by the variable gain amplifier 9, and further, the input signal amplitude and the input signal offset of the equalizer 10 can be controlled to be constant by placing the equalizer 10 in the previous stage of the A/D converter 3, and thus the signal of the maximum amplitude within the dynamic range of the equalizer 10 can be inputted.

Embodiment 6

A sixth embodiment corresponds to the invention, and provides a configuration which emphasizes a high-frequency-band simplification design for the equalizer 10 of the fifth embodiment.

Figure 28:
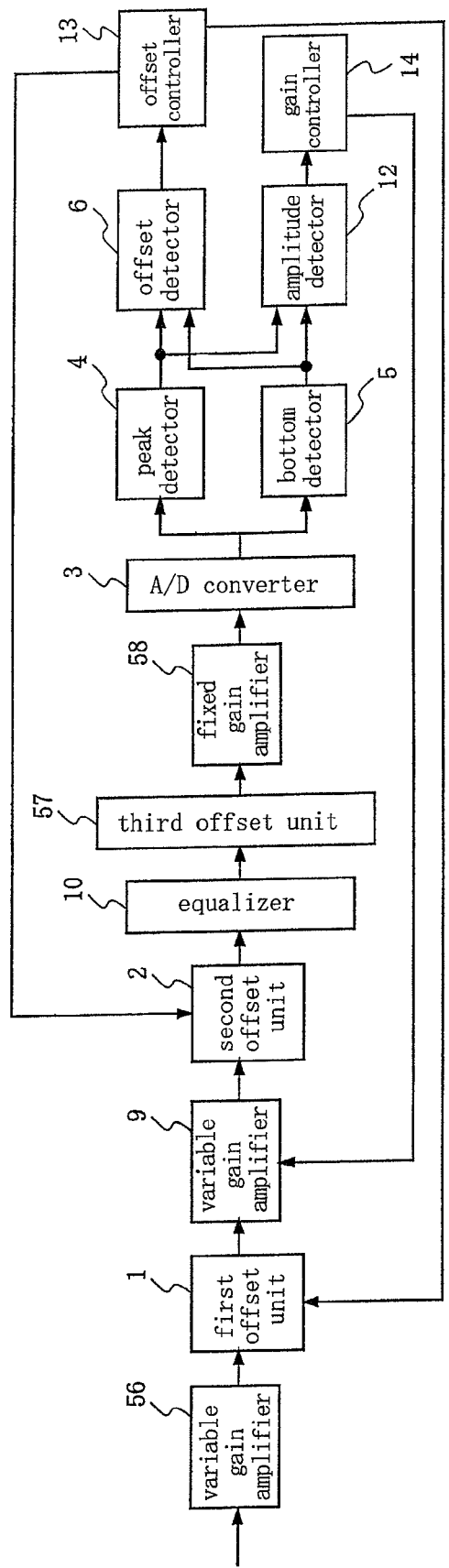
FIG. 28 is a block diagram of a signal processing device according to a sixth embodiment of the present invention.

Hereinafter, the sixth embodiment will be described in detail with reference to the drawings. FIG. 28 is a block diagram of a signal processing device of the sixth embodiment.

This signal processing device comprises a variable gain amplifier 56 which gives a gain according to a set value to a reproduced signal input, a first offset unit 1 which receives an output from the variable gain amplifier 56 as an input signal and gives a DC offset according to an offset control signal to the input signal, a variable gain amplifier 9 which receives an output from the first offset unit 1 as an input signal and gives a gain according to a gain control signal to the input signal, a second offset unit 2 which receives an output from the variable gain amplifier 9 as an input signal and gives a DC offset according to an offset control signal to the input signal, an equalizer 10 which receives an output from the second offset unit 2 as an input signal and emphasizes a high-frequency band thereof, a third offset unit 57 which receives an output from the equalizer 10 as an input signal and gives an offset according to a set value to the input signal, a fixed gain amplifier 58 which receives an output from the offset unit 57 as an input signal and gives a fixed gain to the input signal, an A/D converter 3 which receives an output from the fixed gain amplifier 58 as an input signal, and analog-to-digital converts the input signal by sampling the same with a clock of a predetermined clock period T to output sampling data, a peak detector 4 which receives an output from the A/D converter 3 and performs peak detection with a clock of a period that is m times (m: positive integer) of the above-mentioned clock period, a bottom detector 5 which receives an output from the A/D converter 3 and performs bottom detection with a clock of a period that is n times (n: positive integer) of the above-mentioned clock period, an offset detector 6 which receives an output from the peak detector 4 and an output from the bottom detector 5, and calculates a signal offset in the input signal to the A/D converter 3 to output an offset information signal, an amplitude detector 12 which receives the output from the peak detector 4 and the output from the bottom detector 5, and calculates a signal amplitude in the input signal to the A/D converter 3 to output an amplitude information signal, a gain controller 14 which controls the variable gain amplifier 9 according to the magnitude relation between the amplitude information signal and a target amplitude value, and an offset controller 13 which controls the first and second offset units according to the magnitude relation between offset information signal outputted from the offset detector and a target offset value.

Next, the operation of the sixth embodiment will be described.

The reproduced signal from the information recording medium passes through the variable gain amplifier 56 to be amplified by a gain that is set in the variable gain amplifier 56. It is assumed that the variable gain amplifier 56 is used to absorb variations in the optical pickup and variations in differences among individual information recording media. The gain to be set in the variable gain amplifier 56 is determined from initially learned values of the recorded information reproducing apparatus or values evaluated at the time of development of the reproducing apparatus.

Then, variations in the pickup and the information recording medium are absorbed to some extent, the output of the variable gain amplifier 56 within the reference amplitude range is input to the first offset unit 1, an offset according to a control signal is given to the input by the first offset unit 1, a gain according to a gain control signal is given to the input by the variable gain amplifier 9, and an offset according to an offset control signal is given to the input by the second offset unit 2, and thereafter, waveform equalization is performed by the equalizer. When reproducing a high-density recorded optical recording medium, since the signal amplitudes of relatively short recording marks are degraded due to the optical frequency characteristics, the SNR (Signal to Noise Ratio) of the signal must be improved by boosting up the frequency band by the equalizer 10. Further, in this embodiment, the amplitude of the signal passing through the equalizer 10 can be reduced by inserting the fixed gain amplifier in the previous stage of the A/D converter.

Further, when variation in the circuit offset of the fixed gain amplifier 58 is large, this variation can be absorbed by the third offset unit 57. In order to absorb the influence of the variation in the offset of the fixed gain amplifier 58, the offset unit 57 which receives the output of the equalizer 10 is desired to be set at a value which comes to the center level of the A/D converter 3 at the time of the initial learning for the reproducing apparatus or the shipping inspection for the LSI. However, if the variation in the offset of the fixed gain amplifier does not affect the characteristics, the offset unit 57 is not particularly required.

The output of the fixed gain amplifier 58 is sampled with a clock of a predetermined clock period T to be converted into a quantized digital signal by the A/D converter 3.

Next, peak detection and bottom detection from the quantized digital signal are performed by the peak detector 4 and the bottom detector 5, respectively. The peak detection and bottom detection operations are identical to those of the first embodiment, and both may be performed with a clock of the same period as the clock of the predetermined clock period T. However, peak detection and bottom detection can be similarly performed by operating the peak detector 4 and the bottom detector 5 with mT period and nT period, respectively (m, n are positive integers independent from each other, i.e., n is a positive integer different from m) or by operating both detectors with nT period (i.e., m, n are the same positive integer not less than 2), thereby realizing a reduction in power consumption.

Then, offset detection form the detected peak value and the detected bottom value is performed by the offset detector 6. The offset detection can be realized by detecting a sum of the peak value and the bottom value, or a difference in distance from the A/D center level, or whether the peak value and the bottom value are respectively within the predetermined window ranges or not. The detected offset is shown in FIG. 13.

Further, amplitude detection is performed by the amplitude detector 12. For example, amplitude detection is realized by calculating a difference between the peak value and the bottom value.

The operation of the offset controller 13 is identical to that of the first embodiment.

The gain controller 14 compares the detected amplitude value with a predetermined target amplitude value. When the detected amplitude value is smaller than the target value, the gain controller 14 outputs a control signal to increase the gain of the variable gain amplifier 9, and when the detected amplitude value is larger than the target value, it outputs a control signal to reduce the gain of the variable gain amplifier 9.

While in the fifth embodiment it is described that the signal is desired to be passed with the maximum amplitude within the dynamic range from the viewpoint of SNR, it is effective to reduce the amplitude of the passing signal in order to simplify the high bandwidth design from the viewpoint of analog circuit design. Since distortion characteristics can be easily ensured when the amplitude is small, such small amplitude is suitable for the high bandwidth design.

As described above, according to the sixth embodiment, the third offset unit 57 which gives a DC offset according to a set value to the output of the equalizer 10, and the fixed gain amplifier 58 which gives a fixed gain to the output of the third offset unit 57 to output the result to the A/D converter are further provided between the equalizer 10 and the A/D converter 3 in addition to the configuration of the fifth embodiment. Therefore, a difference in DC component can be absorbed without increasing the number of terminals, and the amplitude of the signal passing through the equalizer 10 can be reduced by the fixed gain amplifier 58, and thus the high bandwidth design is facilitated, and variation in the circuit offset of the fixed gain amplifier 58 can be absorbed by the third offset unit 57.

While in the first to sixth embodiments the first offset unit and the second offset unit are connected in series, since the first and second offset units are exclusively controlled, these offset units may be connected in parallel.

In this case, however, one of the first and second offset units, which is active, gives an offset to the input signal and outputs the signal, while the other one which is inactive outputs no signal.

As described above, the signal processing device of the present invention can realize stable A/D conversion by performing adjustment so as to constantly input a reproduced signal within the dynamic range of the A/D converter without increasing the number of terminals even when a steep difference in DC voltage exists in an analog reproduction signal that is read from an information recording medium such as an optical disc.

The invention claimed is:

1. A signal processing device, comprising:
    a first offset unit configured to provide a DC offset by high-speed operation according to an offset control signal to a reproduced signal input to absorb drastic DC offset;
    a second offset unit configured to provide a DC offset by low-speed operation according to an offset control signal to the reproduced signal input to absorb offset of the reproduced signal having asymmetry;
    an A/D converter configured to provide an output from the first offset unit or an output from the second offset unit as an input signal, and to analog-to-digital convert the input signal by sampling the input signal with a clock having a predetermined clock period T and output sampling data;
    a peak detector configured to receive an output from the A/D converter, and perform peak detection with a clock having a period that is m times (m being a positive integer) of the clock period T;
    a bottom detector configured to receive an output from the A/D converter, and perform bottom detection with a clock having a period that is n times (n being a positive integer) of the clock period T;
    an offset detector configured to receive an output from the peak detector and an output from the bottom detector, calculate a signal offset in the input signal to the A/D converter and output an offset information signal; and
    a controller configured to exclusively control the offset controls provided by the first and second offset units according to the offset information signal outputted from the offset detector;
    a gate signal generator configured to generate a gate signal; and
    a storage unit configured to store information regarding a control signal outputted from the controller,
    wherein the controller exclusively controls the offset control operations performed by the first and second offset units according to the offset information signal and the gate signal,
    a hold information to be input to the controller is controlled by the gate signal outputted from the gate signal generator and the first offset controller instantaneously absorbs the drastic DC offset by using the hold information stored in the storing unit, and
    the offset in the input signal to the A/D converter is kept approximately constant independently of a local variation in the reproduced signal.

2. A signal processing device as defined in claim 1, wherein the gate signal outputted from the gate generator is a signal for distinguishing between a region where data is written and a region where data is not written on a recording medium.

3. A signal processing device as defined in claim 1, wherein the gate generator sets the gate signal to be outputted therefrom, to different types of gate signals before and after acquisition of address information of the recording medium.

4. A signal processing device as defined in claim 1, wherein the gate signal outputted from the gate generator is a signal for distinguishing between a header region where address data is recorded and a data region where user data is recorded on a recording medium.

5. A signal processing device as defined in claim 1, further comprising:
    a controller which is able to hold a control operation or change a control speed upon reception of a hold signal,
    wherein the signal offset in the input signal to the A/D converter is kept approximately constant independently of a local variation in the reproduced signal.

6. A signal processing device as defined in claim 1, further comprising:
    a signal detector configured to receive the outputs from the peak detector and the bottom detector, and calculate a signal amplitude in the input signal to the A/D converter to output an amplitude information signal; and
    a hold signal generator configured to receive at least one of the output from the A/D converter, the output from the bottom detector, the output from the offset detector, and the amplitude information signal, and detects a lack of an external input signal to output a hold signal, wherein the hold signal enables holding of a control operation of the controller or switching of a control speed.

7. A signal processing device, comprising:

a first variable gain amplifier configured to provide a gain by high-speed operation according to a set value to a reproduced signal input to absorb drastic DC offset;

a first offset unit configured to receive an output from the first variable gain amplifier as an input signal, and provide a DC offset according to an offset control signal to the input signal;

a second variable gain amplifier configured to receive an output from the first offset unit as an input signal, and provide a gain according to a gain control signal to the input signal;

a second offset unit configured to receive an output of the second variable gain amplifier as an input signal, and provide a DC offset by low-speed operation according to an offset control signal to the input signal to absorb offset of the reproduced signal having asymmetry;

an equalizer configured to receive an output from the second offset unit, and emphasize a high-frequency band thereof;

an A/D converter configured to receive an output from the equalizer as an input signal, and analog-to-digital converting convert the input signal by sampling the input signal with a clock having a predetermined clock period T and output sampling data;

a peak detector configured to receive an output from the A/D converter, and perform peak detection with a clock having a period that is m times (m being a positive integer) of the clock period T;

a bottom detector configured to receive an output from the A/D converter, and perform bottom detection with a clock having a period that is n times (n being a positive integer) of the clock period T;

an offset detector configured to receive an output from the peak detector and an output from the bottom detector, calculate a signal offset in the input signal to the A/D converter and output an offset information signal;

an amplitude detector configured to receive an output from the peak detector and an output from the bottom detector, calculate a signal amplitude in the input signal to the A/D converter and output an amplitude information signal;

a gain controller configured to control the first and second variable gain amplifiers according to a magnitude relationship between the amplitude information signal and a target amplitude value; and an offset controller configured to control the first and second offset units according to the magnitude relationship between the offset information signal outputted from the offset detector and a target offset value;

a gate signal generator configured to generate a gate signal; and a storage unit configured to store information regarding a control signal outputted from the controller, wherein the controller exclusively controls the offset control operations performed by the first and second offset units according to the offset information signal and the gate signal, a hold information to be input to the controller is controlled by the gate signal outputted from the gate signal generator and the first offset controller instantaneously absorbs the drastic DC offset by using the hold information from the storing unit, and the signal amplitude and the offset in the input signal to the A/D converter are kept approximately constant independently of a local variation in the reproduced signal.

8. A signal processing device as defined in claim 7, further comprising:

a third offset unit configured to receive the output from the equalizer as an input signal, and provide a DC offset according to a set value to the input signal; and a fixed gain amplifier configured to receive an output from the third offset unit as an input signal, and provide a fixed gain to the input signal and output a signal to the A/D converter, wherein the third offset unit and the fixed gain amplifier are placed between the equalizer and the A/D converter.

* * * * *